(12) United States Patent
Park

(10) Patent No.: US 10,111,290 B2
(45) Date of Patent: Oct. 23, 2018

(54) APPARATUS FOR SYNCHRONOUS DRIVING OF MULTI-CHANNEL LIGHT EMITTING DIODES

(71) Applicant: POINT TEK CO., LTD., Yongin-si (KR)

(72) Inventor: Shi Hong Park, Seoul (KR)

(73) Assignee: Point Tek Co., Ltd., Yongin-si (KR)

( * ) Notice: Subject to any disclaimer, the term of this patent is extended or adjusted under 35 U.S.C. 154(b) by 0 days.

(21) Appl. No.: 15/504,441

(22) PCT Filed: Aug. 18, 2015

(86) PCT No.: PCT/KR2015/008570
§ 371 (c)(1),
(2) Date: Feb. 16, 2017

(87) PCT Pub. No.: WO2016/028043
PCT Pub. Date: Feb. 25, 2016

(65) Prior Publication Data
US 2018/0092167 A1 Mar. 29, 2018

(30) Foreign Application Priority Data

Aug. 18, 2014 (KR) .......................... 10-2014-0106751

(51) Int. Cl.
*H05B 37/02* (2006.01)
*H05B 33/08* (2006.01)
(52) U.S. Cl.
CPC ......... *H05B 33/083* (2013.01); *H05B 33/089* (2013.01); *H05B 33/0818* (2013.01); *H05B 33/0827* (2013.01)
(58) Field of Classification Search
None
See application file for complete search history.

(56) References Cited

U.S. PATENT DOCUMENTS

2008/0068298 A1 3/2008 Shen et al.
2011/0248640 A1 10/2011 Welten
(Continued)

FOREIGN PATENT DOCUMENTS

JP 2009-290183 A 12/2009
JP 2013-127709 A 6/2013
(Continued)

OTHER PUBLICATIONS

International Preliminary Report on Patentability issued for PCT/KR2015/008570, dated Feb. 21, 2017.
(Continued)

*Primary Examiner* — Tung X Le
*Assistant Examiner* — Henry Luong
(74) *Attorney, Agent, or Firm* — Westerman, Champlin & Koehler, P.A.; Amanda M. Prose

(57) ABSTRACT

Disclosed is an apparatus for synchronous driving of multi-channel light emitting diodes capable of driving all light emitting diodes at the same time regardless of an input voltage level. The apparatus includes: a rectification unit rectifying an AC voltage; a multi-channel light emitting diode unit including at least a first light emitting diode and a second light emitting diode, and being driven by receiving the rectified current; a current sensor unit sensing a current flowing in the first light emitting diode; a current mirror unit mirroring the current sensed by the current sensor, and supplying the mirrored current to the second first light emitting diode; and a sequential current driving unit connected to the first light emitting diode and the second light emitting diode, providing a path to a current flowing in the first light emitting diode or in the second light emitting diode, and activating the current sensor unit.

20 Claims, 21 Drawing Sheets

(56) References Cited

U.S. PATENT DOCUMENTS

| | | | |
|---|---|---|---|
| 2012/0217887 A1* | 8/2012 | Kang | H05B 33/0809 |
| | | | 315/193 |
| 2013/0300294 A1 | 11/2013 | Jungwirth | |
| 2014/0117854 A1 | 5/2014 | Liu et al. | |
| 2014/0184078 A1 | 7/2014 | Hwang et al. | |

FOREIGN PATENT DOCUMENTS

| | | | |
|---|---|---|---|
| KR | 10-2010-0121803 A | 11/2010 | |
| KR | 10-2013-0029709 A | 3/2013 | |
| KR | 10-2014-0070289 A | 6/2014 | |
| KR | 10-2014-0086480 A | 7/2014 | |
| TW | 200950589 A | 12/2009 | |
| WO | 2013039324 A2 | 3/2013 | |

OTHER PUBLICATIONS

International Search Report issued for PCT/KR2015/008570, dated Dec. 11, 2015.
Written Opinion of the International Searching Authority issued for PCT/KR2015/008570, dated Dec. 11, 2015.

* cited by examiner

APPARATUS FOR SYNCHRONOUS DRIVING OF MULTI-CHANNEL LIGHT EMITTING DIODES

CROSS-REFERENCE TO RELATED APPLICATION

This application is a Section 371 National Stage Application of International Application No. PCT/KR2015/008570, filed Aug. 18, 2015, and published as WO2016/028043 on Feb. 25, 2016, which claims priority to and benefits of KR Patent Application Serial No. 10-2014-0106751, filed with the Korean Intellectual Property Office on Aug. 18, 2014, the entire contents of which are incorporated herein by reference.

BACKGROUND OF THE INVENTION

Field of the Invention

The present invention generally relates to an apparatus for synchronous driving of multi-channel light emitting diodes. More particular, the present invention relates to an apparatus for synchronous driving multi-channel light emitting diodes that is capable of driving all the multi-channel light emitting diodes at the same time regardless of an input voltage level while driving the multi-channel light emitting diodes using an AC linear direct drive type that does not use a converter.

Description of the Related Art

Light driving methods for light emitting diodes may be classified into: a converter type that uses a switching mode power supply (SMPS) mode that uses an inductor and a capacitor to control current and an AC linear direct drive type that controls current by directly using commercial power and without using the SMPS.

First, in the converter type, a system configuration is complex and is difficult to reduce size and weight thereof. In addition, an additional power factor correction circuit has to be used in order to improve a power factor thereof. In addition, an additional circuit to prevent the generation of electromagnetic waves generated at the time of switching is required, and thus manufacturing cost thereof increases.

Meanwhile, in the AC linear direct drive type, current is controlled by directly connecting commercial power, thus a circuit thereof is simpler than that of the converter type. However, flicker occurs with AC linear direct drive type while flicker does not occur in the converter type since the converter type is able to output constant current within a low voltage section of the AC voltage by using an inductor and a capacitor that are energy storage elements.

Herein, flicker means that intensity of light that is periodically changed is visually observed. There are two method of quantifying a flicker degree, a percentage flicker and a flicker index. Herein, the percentage flicker refers to a percentage of the difference between the maximum light intensity and the minimum light intensity divided by the sum of the maximum light intensity and the minimum light intensity. The higher the value is, the worse the flicker characteristic is. The flicker index refers to a value obtained by dividing the light quantity exceeding the average thereof by the average light intensity. The flicker index is in a range from 0 to 1, the lower the index is, and the better the flicker characteristic is.

When using an AC input, in order to improve the percentage flicker, an inductor or a capacitor as energy storage elements are necessarily required since current has to be supplied to the light emitting diode even though an input voltage is 0. Therefore, when the AC linear direct drive type that directly uses AC voltage without a converter or a capacitor is used, the percentage flicker always becomes 100%, which is the worst case. As a result, the difference of AC linear direct drive types should be specifically identified through the flicker index rather than the percentage flicker.

FIGS. 1A and 1B respectively show a driving circuit using a conventional linear method, and voltages VIN and Vin and currents IIN and Iin input according to a time t of the driving circuit using the conventional linear method. Herein, since approximate trends of time t, voltages VIN and Vin, and currents IIN and Iin are more important than detailed values thereof, numerical values and units thereof are omitted.

As shown in FIGS. 1A and 1B, when the input voltages VIN and Vin is less than a turn-on voltage of light emitting diodes LED1, LED2, LED3, and LED4, current does not flow in the light emitting diodes LED1, LED2, LED3, and LED4, thus a flicker index becomes high, a power factor becomes low, and a total harmonic distortion (THD) becomes high.

FIG. 2A is a view showing a multi-channel driving circuit of using a conventional sequential driving method, and FIG. 2B is a graph showing characteristics of input voltage and current according to a time for the multi-channel driving circuit using the conventional sequential driving method. In FIGS. 2A and 2B, a plurality of switches SW1, SW2, SW3, and SW4 are controlled according to an input voltage VIN compared to the conventional method of simultaneously driving with only one channel shown in FIG. 1A. Herein, there may be an improvement in the flicker index, a power factor, a THD, and efficiency characteristic.

However, as the case of FIG. 1A, an AC voltage VAC is used to directly control light emitting diodes LED1, LED2, LED3, and LED4 in FIG. 2A, thus when voltage applied to the light emitting diodes LED1, LED2, LED3, and LED4 that are serially connected with each other is less than a voltage required for driving the overall light emitting diodes LED1, LED2, LED3, and LED4, there may be many sections in which the light emitting diodes are not driven, so the flicker index becomes high.

FIG. 3 is a view showing a multi-channel circuit operation using the conventional sequential driving method of FIG. 2A. The operation of the light emitting diodes LED1, LED2, LED3, and LED4 according to the input voltage will be described with reference to FIG. 3.

First, when an input voltage Vin is equal to or less than a driving voltage VLED1 of a first light emitting diode (section 0), all of the light emitting diodes LED1, LED2, LED3, and LED4 are turned off.

Meanwhile, when the input voltage Vin is greater than the driving voltage VLED1 of the first light emitting diode LED1 and is equal to or less than a sum of the driving voltage VLED1 of the first light emitting diode LED1 and a driving voltage VLED2 of a second light emitting diode LED2 (VLED1+VLED2) (section 1), the first light emitting diode LED1 is turned on and the remaining light emitting diodes LED2, LED3 and LED4 are turned off.

In addition, when the input voltage Vin is greater than the sum of the driving voltage VLED1 of the first light emitting diode LED1 and the driving voltage VLED2 of the second light emitting diode LED2 (VLED1+VLED2) and is equal to or less than a sum of the driving voltage VLED1 of the first light emitting diode LED1 to a driving voltage VLED3 of the third light emitting diode LED3 (VLED1+VLED2+VLED3) (section 2), the first light emitting diode LED1 and the second light emitting diode LED2 are turned on and the remaining two light emitting diodes LED3 and LED4 are turned off.

When the input voltage Vin is greater than the sum of the driving voltage VLED1 of the first light emitting diode LED1 to the driving voltage VLED3 of the third light emitting diode LED3(VLED1+VLED2+VLED3) and is equal to or less than a sum of the driving voltage VLED1 of the first light emitting diode LED1 to a driving voltage VLED4 of the fourth light emitting diode LED4(VLED1+VLED2+VLED3+VLED4) (section 3), the first light emitting diode LED1, the second light emitting diode LED2 and the third light emitting diode LED3 are turned on, and the remaining fourth light emitting diode LED4 is turned off.

Finally, when the input voltage Vin is greater the sum of the driving voltage VLED1 of the first light emitting diode LED1 to the driving voltage VLED4 of the fourth light emitting diode LED4(VLED1+VLED2+VLED3+VLED4) (section 4), all of the light emitting diodes LED1, LED2, LED3, and LED4 are turned on.

As described above, in the multi-channel driving circuit using the conventional sequential driving method, since the light emitting diodes are tuned on or turned off according to an input voltage level, turned-off times of the light emitting diodes becomes long, and as a result, a flicker characteristic becomes worse.

Meanwhile, recently, there has been much effort to set reinforced flicker regulations for LED lighting devices. Flicker regulations are reinforced since researchers have reported that long exposure to lighting devices with a high flicker index may cause problems such as dizziness or seizures in sensitive persons. In other words, though the linear type that directly uses AC power has a simpler configuration than that of the converter type, has high reliability due to the simple configuration thereof, has advantages of being lightweight and compact, and has low manufacturing costs, the flicker characteristics of the linear type is problematic in that new regulations expected to be enacted in the future are not satisfied, thus there is a problem that they can no longer be used in general lighting devices.

In addition, in the multi-channel driving circuit using the conventional sequential driving method shown in FIG. 2A, since a number of driven light emitting diodes increases according to an input voltage level, all of the light emitting diodes are turned on at the same time when the input voltage is greater than a sum of all driving voltages of the light emitting diodes, and a part of the light emitting diodes are turned off when the input voltage is small, thus the flicker index becomes high.

SUMMARY OF THE INVENTION

Accordingly, the present invention has been made keeping in mind the above problems occurring in the related art, and an object of the present invention is to provide an apparatus for synchronous driving of multi-channel light emitting diodes that satisfies characteristics of flicker improvement, high power factor and light efficiency, and a low THD without using energy storage elements such as a capacitor by using a synchronous driving circuit for multi-channel light emitting diodes capable of properly adjusting connection states of light emitting diodes according to an input voltage level.

In order to achieve the above object, according to one embodiment of the present invention, there is provided a apparatus for synchronous driving of multi-channel light emitting diodes, the apparatus including: a rectification unit receiving and rectifying an AC voltage; a multi-channel light emitting diode unit in which a plurality of light emitting diodes are serially connected with each other, the plurality of light emitting diodes including at least a first light emitting diode and a second light emitting diode, and being driven to emit light by receiving the rectified current from the rectification unit; a current sensor unit sensing a current flowing in the first light emitting diode; a current mirror unit mirroring the current sensed by the current sensor unit, and supplying the mirrored current to the second light emitting diode; and a sequential current driving unit connected to both the first light emitting diode and the second light emitting diode, providing a path to a current flowing in the first light emitting diode or in the second light emitting diode, and activating the current sensor unit according to an input voltage level.

Herein, the current mirror unit may include: a current mirror that is connected to an anode of the first light emitting diode through a first terminal thereof, connected to the current sensor unit through a second terminal thereof, and connected to an anode of the second light emitting diode through a third terminal thereof to generate the mirrored current from the sensed current; and a diode that is connected to a cathode of the first light emitting diode through an anode thereof, connected to the anode of the second light emitting diode through a cathode thereof to transmit the mirrored current to the second light emitting diode by receiving the mirrored current so that the mirrored current is prevented from being reversed to the first light emitting diode.

Meanwhile, the current sensor unit may include a current sensor that is connected to the cathode of the first light emitting diode through a first terminal thereof, connected to the current mirror through a second terminal thereof, and connected to the sequential current driving unit through a third terminal thereof to transmit the sensed current to the sequential current driving unit.

In addition, the sequential current driving unit may include: a first MOSFET receiving a voltage that determines a current amount flowing in the first light emitting diode through a gate thereof, connected to the second terminal of the current sensor through a drain terminal thereof and connected to the rectification unit through a source terminal thereof, and turned on when the input voltage level is equal to or greater than a driving voltage of the first light emitting diode and is equal to or less than a sum of the driving voltage of the first light emitting diode and a driving voltage of the second light emitting diode; and a second MOSFET receiving a voltage that determines a current amount flowing in the second light emitting diode through a gate thereof, connected to the cathode of the second light emitting diode through a drain terminal thereof and connected to the rectification unit through a source terminal thereof, and turned on when the first MOSFET is turned on or when the input voltage level exceeds the sum of the driving voltage of the first light emitting diode and the driving voltage of the second light emitting diode.

Meanwhile, the current sensor may include: a first sensing resistor connected to the cathode of the first light emitting diode through a first terminal thereof and connected to the sequential current driving unit through a second terminal thereof; and a first transistor connected to the first terminal of the first sensing resistor through a gate thereof, connected to the second terminal of the first sensing resistor through a source terminal thereof, and connected to the current mirror through a drain terminal thereof.

In addition, the current mirror may include: a second sensing resistor connected to the anode of the first light emitting diode through a first terminal thereof and connected to the drain terminal of the first transistor through a second terminal thereof; and a second transistor connected to the second terminal of the second sensing resistor through a gate thereof, connected to the first terminal of the second sensing resistor through a source terminal thereof, and connected to the anode of the second light emitting diode through a drain terminal thereof.

In addition, the current mirror may be an amplification circuit for generating an amplified current that is proportional to the sensed current as the mirrored current.

In addition, the first transistor may be an N-type MOSFET and the second transistor is a P-type MOSFET.

In addition, the current sensor may be a first cascode current mirror circuit, and the current mirror may be a second cascode current mirror circuit that is complementary to the first cascode current mirror circuit.

Meanwhile, the current sensor may be a first Wilson current mirror circuit, and the current mirror may be a second Wilson current mirror circuit that is complementary to the first Wilson current mirror circuit.

In addition, the current sensor may be a first Widlar current mirror circuit, and the current mirror may be a second Widlar current mirror circuit that is complementary to the first Widlar current mirror circuit.

In addition, the current sensor may include an amplification circuit that senses a current proportional to the sensed current and transmits the sensed proportional current to the current mirroring unit.

Meanwhile, the current sensor may include: a third sensing resistor connected to the cathode of the first light emitting diode through a first terminal thereof and connected to the sequential current driving unit through a second terminal thereof; and a first voltage-current conversion circuit connected to the first terminal of the third sensing resistor through a first terminal thereof, connected to the second terminal of the third sensing resistor through a second terminal thereof, and connected to the current mirror through a third terminal thereof so as to convert a voltage applied to the third sensing resistor to a current and to transmit the converted current to the current mirror.

In addition, the current mirror may include: a fourth sensing resistor connected to the anode of the first light emitting diode through a first terminal thereof and connected to the third terminal of the first voltage-current conversion circuit through a second terminal thereof; and a second voltage-current conversion circuit connected to the first terminal of the fourth sensing resistor through a first terminal thereof, connected to the second terminal of the fourth sensing resistor through a second terminal thereof, and connected to the anode of the second light emitting diode through a third terminal thereof so as to convert a voltage applied to the fourth sensing resistor to a current and to transmit the converted current to second light emitting diode.

In addition, the multi-channel light emitting diode unit may further include: a third light emitting diode, and wherein the current mirror unit may further include: a parallel current mirror connected to the anode of the second light emitting diode through a first terminal thereof, connected to the current sensor unit through a second terminal thereof, and connected to an anode of the third light emitting diode through a third terminal thereof so as to generate the mirrored current from the sensed current; and wherein the current mirror may further include a fourth terminal connected to the anode of the third light emitting diode.

In order to achieve the above object, according to another embodiment of the present invention, there is provided a apparatus for synchronous driving of multi-channel light emitting diodes, the apparatus including: a rectification unit receiving and rectifying an AC voltage; a multi-channel light emitting diode unit in which a plurality of light emitting diodes are serially connected with each other, the plurality of light emitting diodes including at least a first light emitting diode and a second light emitting diode, and being driven to emit light by receiving the rectified current from the rectification unit; a current mirror unit mirroring a current flowing in the first light emitting diode, and supplying the mirrored current to the second light emitting diode; and a current sensing and sequential current driving unit connected to both the first light emitting diode and the second light emitting diode, providing a path to a current flowing in the first light emitting diode or in the second light emitting diode, and activating the current mirror unit according to a plurality of input voltage levels.

Herein, the current sensing and sequential current driving unit may include: a first current driving MOSFET receiving a first input voltage having a first input voltage level of the plurality input voltage levels through a gate thereof, connected to a cathode of the first light emitting diode through a drain terminal thereof and connected to the rectification unit through a source terminal thereof, and turned on according to the first input voltage level; a second current driving MOSFET receiving a second input voltage having a second input voltage level of the plurality input voltage levels through a gate thereof, connected to a cathode of the second light emitting diode through a drain terminal thereof and connected to the rectification unit through a source terminal thereof, and turned on according to the second input voltage level; a first current sensing MOSFET connected to the gate of the first current driving MOSFET through a gate thereof and connected to the source terminal of the first current driving MOSFET through a source terminal thereof, and turned on according to the first input voltage level; and a second current sensing MOSFET connected to the gate of the second current driving MOSFET through a gate thereof and connected to the source terminal of the second current driving MOSFET through a source terminal thereof, and turned on according to the second input voltage level.

Herein, the current sensing and sequential current driving unit may form a cascade circuit by serially and respectively arranging bias MOSFETs to the drain terminals of the first current driving MOSFET, the second current driving MOSFET, the first current sensing MOSFET, and the second current sensing MOSFET, with bias voltages being respectively applied to gates of the bias MOSFETs.

In addition, the current sensing and sequential current driving unit may include: a first current driving MOSFET receiving a first input voltage having a first input voltage level of the plurality input voltage levels through a gate thereof, connected to a cathode of the first light emitting diode through a drain terminal thereof and connected to the rectification unit through a source terminal thereof, and turned on according to the first input voltage level; a second current driving MOSFET receiving a second input voltage having a second input voltage level of the plurality input voltage levels through a gate thereof, connected to a cathode of the second light emitting diode through a drain terminal thereof and connected to the rectification unit through a source terminal thereof, and turned on according to the second input voltage level; a first current sensing mirror connected to the current mirror unit through a first terminal thereof, connected to the cathode of the first light emitting diode through a second terminal thereof and connected to the drain terminal of the first current driving MOSFET through a third terminal thereof; and a second current sensing mirror connected to the current mirror unit through a first terminal thereof, connected to the cathode of the second light emitting diode through a second terminal thereof and connected to the drain terminal of the second current driving MOSFET through a third terminal thereof; wherein bias MOSFETs are serially and respectively arranged to the drain terminals of the first current driving MOSFET and the second current driving MOSFET, and to the first terminals of the first current sensing mirror and the second current sensing mirror to form a cascade circuit, with bias voltages being respectively applied to gates of the bias MOSFETs.

Meanwhile, the multi-channel light emitting diode unit may further include: a third light emitting diode, and wherein the current mirror unit may further include: a parallel current mirror connected to the anode of the second light emitting diode through a first terminal thereof, connected to the current sensor unit through a second terminal thereof, and connected to an anode of the third light emitting diode through a third terminal thereof so as to generate the mirrored current from the sensed current; and wherein the parallel current mirror may further include a fourth terminal connected to the anode of the third light emitting diode.

According to the present invention described above, there is an effect of satisfying characteristics of flicker improvement, high power factor and light efficiency, and a low THD without using energy storage elements such as a capacitor of the converter type that requires a complex circuit by using a synchronous driving circuit for multi-channel light emitting diodes capable of properly adjusting connection states of light emitting diodes according to an input voltage level.

In addition, according to the apparatus for synchronous driving of the multi-channel light emitting diodes of the present invention described above, when current is provided above the minimum input voltage, all light emitting diodes are turned on without using an inductor or a transformer. Accordingly, the overall configuration can be simplified and manufacturing costs can be reduced since a switching operation at a high frequency and an EMI filter are not required.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1A:
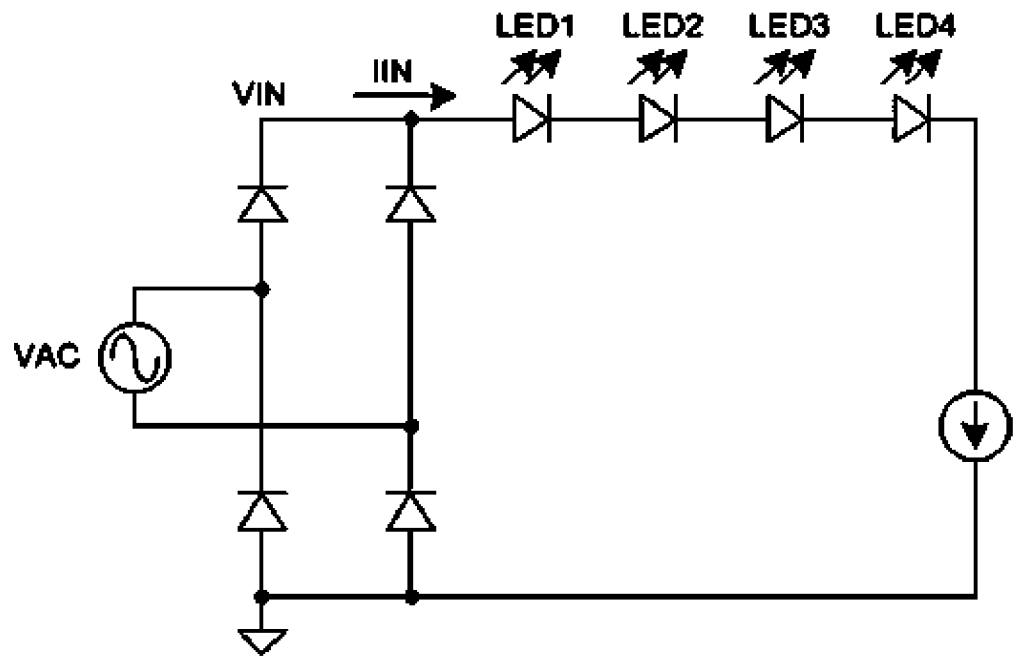
FIG. 1A is a view showing a driving circuit using a conventional linear method.
Figure 1B:
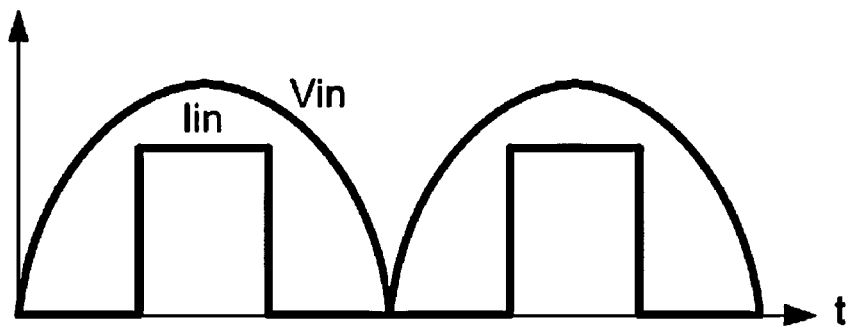
FIG. 1B is a graph showing an input voltage and input current according to the driving circuit using the conventional linear method.
Figure 2A:
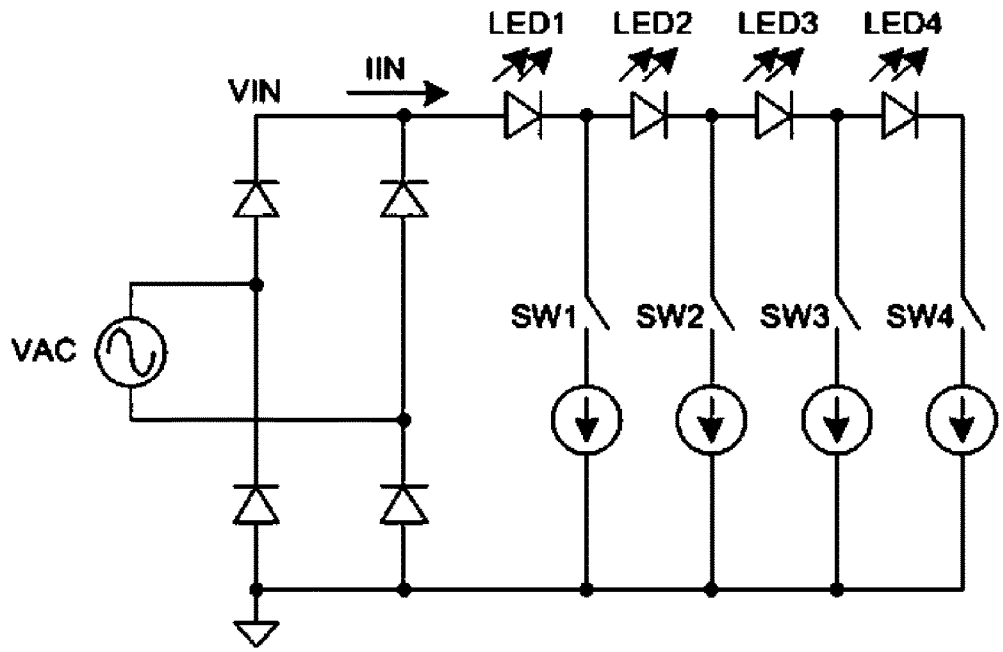
FIG. 2A is a view showing a multi-channel driving circuit using a conventional sequential driving method.
Figure 2B:
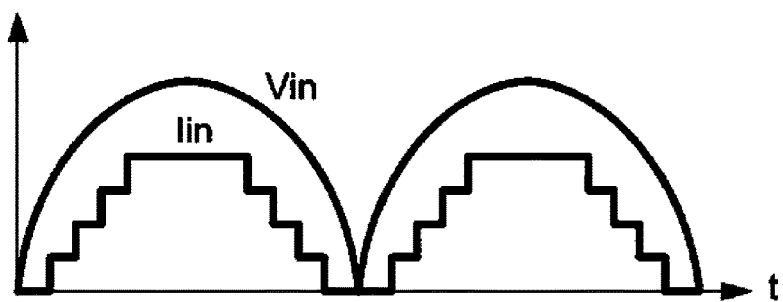
FIG. 2B is a graph showing an input voltage and input current according to the multi-channel driving circuit using the conventional sequential driving method.

Hereinbelow, exemplary embodiments of the present invention will be described in detail with reference to the accompanying drawings. The invention may, however, be embodied in many different forms and should not be construed as being limited to the embodiments set forth herein.

Rather, these embodiments are provided so that this disclosure will be thorough and complete, and will fully convey the scope of the invention to those skilled in the art. Thus, the shapes and sizes of components shown in the drawings may be exaggerated for clarity. Elements having substantially the same or equivalent constitutions and functions are referred to by the same reference numerals throughout the specification.

Terms described in the present disclosure may be understood as follows.

While terms such as "first" and "second" etc., may be used to describe various components, such components must not be understood as being limited to the above terms. For example, a first component may be referred to as a second component without departing from the scope of rights of the present invention, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" or "include" and variations such as "comprises" or "comprising," will be understood to imply the inclusion of stated elements but not the exclusion of any other elements.

Figure 4:
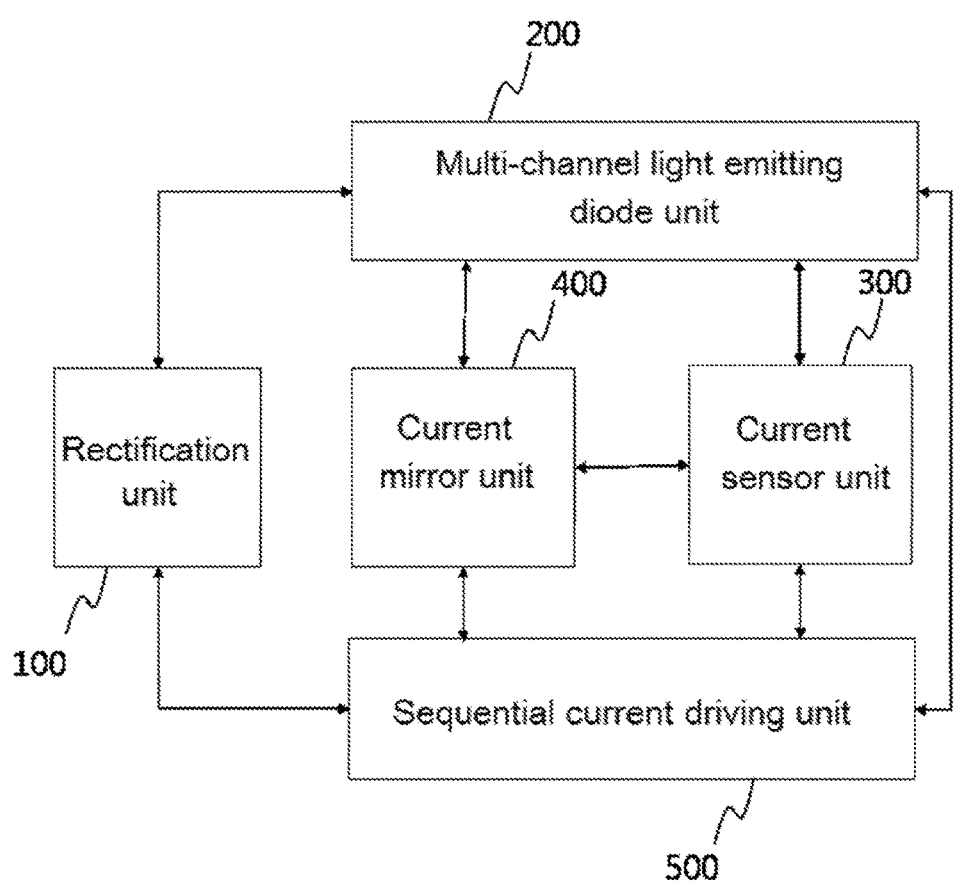
FIG. 4 is a view showing an apparatus for synchronous driving of multi-channel light emitting diodes according to an embodiment of the present invention.

FIG. 4 is a view showing an apparatus for synchronous driving of multi-channel light emitting diodes according to an embodiment of the present invention. The apparatus for synchronous driving of the multi-channel light emitting diodes according to an embodiment of the present invention includes a rectification unit 100, a multi-channel light emitting diode unit 200, a current sensor unit 300, a current mirror unit 400, and a sequential current driving unit 500.

The rectification unit 100 receives an AC voltage from AC power, rectifies the received AC voltage, and supplies the rectified current to the multi-channel light emitting diode unit 200. Herein, the rectification unit 100 may be a bridge diode, but it is not limited thereto, any circuit that converts AC current that flows in both the positive and negative directions to a current that flows in one direction may be used.

In addition, the multi-channel light emitting diode unit 200 is driven to emit light by receiving the rectified current from the rectification unit 100 and in which a plurality of light emitting diodes are serially connected with each other, the plurality of light emitting diodes includes at least a first light emitting diode and a second light emitting diode. Herein, a cathode of the first light emitting diode or of N−1th light emitting diode of the plurality of light emitting diodes is connected to the current sensor unit 300, thereby current flowing in the first light emitting diode or the N−1 light emitting diode is sensed. A cathode of Nth light emitting diode (herein, N is a natural number 2 or more, hereinafter the same) that is connected at last may be connected to the sequential current driving unit 500 to be connected to a path of input current according to an input voltage level, but it is not limited thereto.

Meanwhile, the current sensor unit 300 is activated as the input current flows in the sequential current driving unit 500, senses current flowing in the first light emitting diode and provides the sensed current to the current mirror unit 400.

In addition, the current mirror unit 400 mirrors the sensed current sensed by the current sensor unit 300 and provides the mirrored current to the second light emitting diode.

Meanwhile, the sequential current driving unit 500 uses the mirrored current as driving current of the light emitting diodes by activating the current sensor unit 300 according to the input voltage level such that the current mirror unit 400 mirrors the sensed current.

Figure 5:
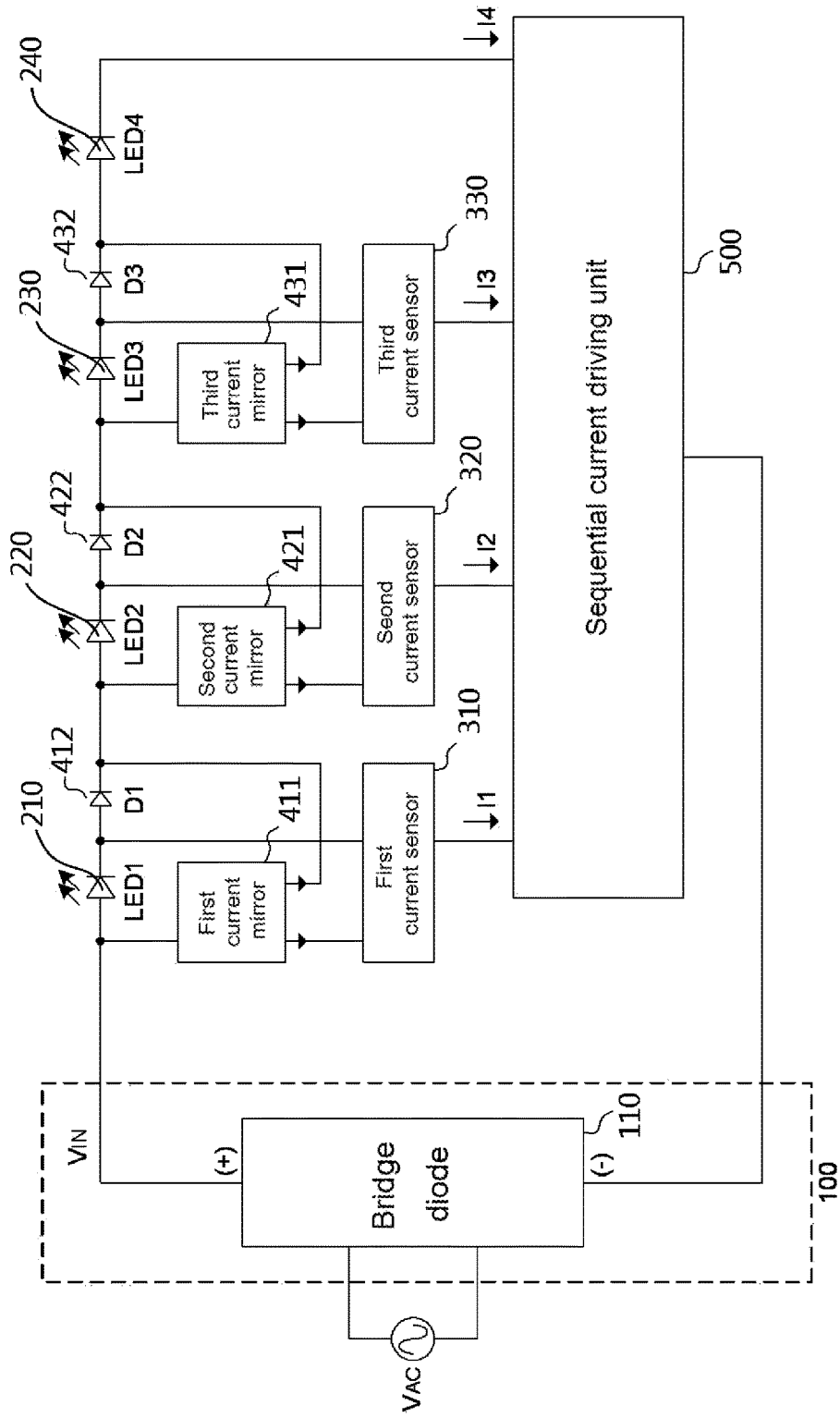
FIG. 5 is a view showing a serial current mirror unit of the apparatus for synchronous driving of the multi-channel light emitting diodes according to the embodiment of the present invention.

FIG. 5 is a view showing a serial current mirror unit 400 of the apparatus for synchronous driving of the multi-channel light emitting diodes according to the embodiment of the present invention. A circuit connection structure of the apparatus for synchronous driving of the multi-channel light emitting diodes according to the embodiment of the present is described in detail with reference to FIG. 5.

First, a bridge diode 110 of the rectification unit 100 is connected to an anode of the first light emitting diode 210 of the multi-channel light emitting diode unit 200 through a positive (+) terminal thereof and connected to the sequential current driving unit 500 through a negative (−) terminal thereof, thereby the AC voltage may be rectified.

In addition, the multi-channel light emitting diode unit 200 may include a first light emitting diode 210, a second light emitting diode 220, a third light emitting diode 230, and a fourth light emitting diode 240. Herein, a 4-channel light emitting diode circuit is used as an example for convenience, but the present invention is not limited thereto, and the present invention may be applied to light emitting diodes having 2 or more channels or having N channels or less.

Herein, the first light emitting diode 210 is connected to the positive (+) terminal of the bridge diode 110 through the anode thereof and connected to an anode of a first diode 412 of the current mirror unit 400 through a cathode thereof, thereby the first light emitting diode 210 may be driven to emit light when current is conducted.

Meanwhile, the second light emitting diode 220 is connected to a cathode of the first diode 412 of the current mirror unit 400 through an anode thereof and connected to an anode of a second diode 422 of the current mirror unit 400 through a cathode thereof, thereby the second light emitting diode 210 may be driven to emit light when current is conducted.

In addition, a third light emitting diode 230 is connected to a cathode of the second diode 422 of the current mirror unit 400 through an anode thereof and connected to an anode of a third diode 432 of the current mirror unit 400 through a cathode thereof, thereby the third light emitting diode 210 may be driven to emit light when current is conducted.

Meanwhile, the fourth light emitting diode 240 is connected to a cathode of the third diode 432 of the current mirror unit 400 through an anode thereof and connected to the sequential current driving unit 500 through a cathode thereof, thereby the fourth light emitting diode 210 may be driven to emit light when current is conducted. Herein, when the sequential current driving unit 500 includes a metal oxide silicon field effect transistor (MOSFET, not shown) that conducts current input to a drain terminal thereof to a source terminal thereof by receiving a voltage through a gate thereof, the cathode of the fourth light emitting diode 240 may be connected to the drain terminal of the MOSFET, but it is not limited thereto.

In addition, the current sensor unit 300 may include a first current sensor 310, a second current sensor 320, and a third current sensor 330 when the four-channel type is used.

First, the first current sensor 310 is connected to the cathode of the first light emitting diode 210 through a first terminal thereof to detect current flowing in the first light emitting diode 210, connected to a first current mirror 411 of the current mirror unit 400 through a second terminal thereof, and connected to the sequential current driving unit 500 through a third terminal thereof to provide the sensed current to the sequential current driving unit 500. Herein, when the sequential current driving unit 500 includes a MOSFET that conducts current I1 that is input to a drain terminal thereof to a source terminal thereof by receiving a voltage through a gate thereof, the third terminal of the first current sensor 310 may be connected to the drain terminal of the MOSFET, but it is not limited thereto.

In addition, the second current sensor 320 is connected to the cathode of the second light emitting diode 220 through a first terminal thereof to detect current flowing in the second light emitting diode 220, connected to a second current mirror 421 of the current mirror unit 400 through a second terminal thereof, and connected to the sequential current driving unit 500 through a third terminal thereof to provide the sensed current to the sequential current driving unit 500. Herein, when the sequential current driving unit 500 includes a MOSFET that conducts current I2 that is input to a drain terminal thereof to a source terminal thereof by receiving a voltage through a gate thereof, the third terminal of the second current sensor 320 may be connected to the drain terminal of the MOSFET, but it is not limited thereto.

Meanwhile, the third current sensor 330 is connected to the cathode of the third light emitting diode 230 through a first terminal thereof to detect current flowing in the third light emitting diode 230, connected to a third current mirror 431 of the current mirror unit 400 through a second terminal thereof, and connected to the sequential current driving unit 500 through a third terminal thereof to provide the sensed current to the sequential current driving unit 500. Herein, when the sequential current driving unit 500 includes a MOSFET that conducts current I3 that is input to a drain terminal thereof to a source terminal thereof by receiving a voltage through a gate thereof, the third terminal of the third current sensor 330 may be connected to the drain terminal of the MOSFET, but it is not limited thereto.

In addition, the current mirror unit 400 may include a first current mirror 411, a first diode 412, a second current mirror 412, a second diode 422, a third current mirror 431, and a third diode 432.

First the first current mirror 411 is connected to the anode of the first light emitting diode 210 through a first terminal thereof, connected to the second terminal of the first current sensor 310 through a second terminal thereof, and connected to a cathode of the first diode 412 and to the anode of the second light emitting diode 220 through a third terminal thereof. Herein, the first current mirror 411 mirrors current sensed by the first current sensor 310, in other words, mirrors current flowing in the first light emitting diode 210 and transmits the mirrored current to the second light emitting diode 220. The mirrored current has the same level as the current flowing in the first light emitting diode 210, but is not limited thereto, the mirrored current may have a proportional relationship to the current flowing in the first light emitting diode 210.

Herein, the first diode 412 is connected to the cathode of the first light emitting diode 210 through an anode thereof and connected to the anode of the second light emitting diode 220 and to the third terminal of the first current mirror 411 through the cathode thereof, thereby the current mirrored by the first current mirror 411 may be prevented from being reversed to the first light emitting diode 210.

Meanwhile, the first current sensor 310, the first current mirror 411, and the first diode 412 function to transmit driving current to the second light emitting diode 220, thus may be handled as a single driving block.

In addition, the second current mirror 421 is connected to the anode of the second light emitting diode 220 through a first terminal thereof, connected to the second terminal of the second current sensor 320 through a second terminal thereof and connected to a cathode of the second diode 422 and to the anode of the third light emitting diode 230 through a third terminal thereof. Herein, the second current mirror 421 mirrors current sensed by the second current sensor 320, in other words, mirrors current flowing in the second light emitting diode 220 and transmits to mirrored current to the third light emitting diode 230. The mirrored current has the same level as the current flowing in the second light emitting diode 220, but is not limited thereto. The mirrored current may have a proportional relationship to the current flowing in the second light emitting diode 220.

Herein, the second diode 422 is connected to the cathode of the second light emitting diode 220 through an anode thereof and connected to the anode of the third light emitting diode 230 and to the third terminal of the second mirror 421 through the cathode thereof, thereby the current mirrored by the second current mirror 421 may be prevented from being reversed to the second light emitting diode 220.

Meanwhile, the second current sensor 320, the second current mirror 421, and the second diode 422 function to transmit driving current to the third light emitting diode 230, thus may be handled as a single driving block.

In addition, the third current mirror 431 is connected to the anode of the third light emitting diode 230 through a first terminal thereof, connected to the second terminal of the third current sensor 330 through a second terminal thereof and connected to a cathode of the third diode 432 and to the anode of the fourth light emitting diode 240 through a third terminal thereof. Herein, the third current mirror 431 mirrors current sensed by the third current sensor 330, in other words, mirrors current flowing in the third light emitting diode 230 and transmits to mirrored current to the fourth light emitting diode 240. The mirrored current has the same level as the current flowing in the third light emitting diode 230, but is not limited thereto. The mirrored current may have a proportional relationship to the current flowing in the third light emitting diode 230.

Herein, the third diode 432 is connected to the cathode of the third light emitting diode 230 through an anode thereof and connected to the anode of the fourth light emitting diode 240 and to the third terminal of the third current mirror 431 through the cathode thereof thereby the current mirrored by the third current mirror 431 may be prevented from being reversed to the third light emitting diode 230.

Meanwhile, the third current sensor 330, the third current mirror 431, and the third diode 432 function to transmit driving current to the fourth light emitting diode 240, thus may be handled as a single driving block.

Figure 3:
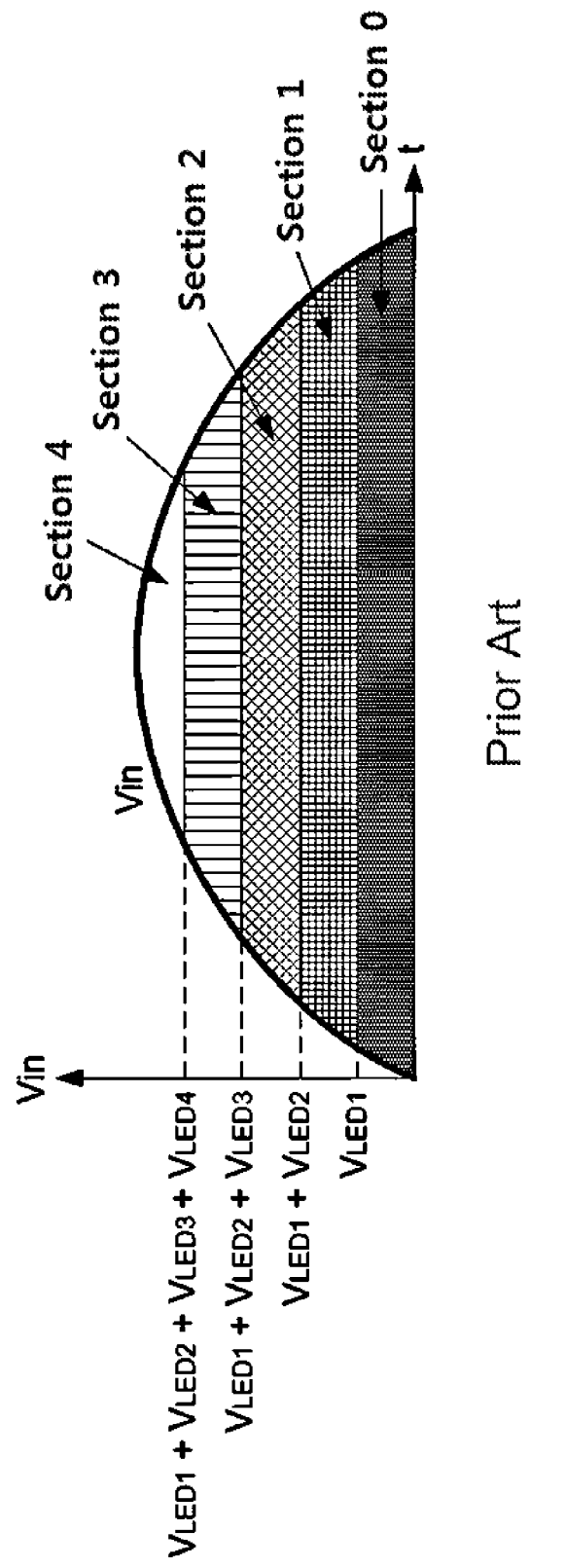
FIG. 3 is a graph showing an operation of the multi-channel driving circuit using the conventional sequential driving method of FIG. 2.

In addition, the sequential current driving unit 500 includes a switching element therein and conducts current to different paths according to an input voltage level. For example, in the sections of the input voltage level as shown in FIG. 3, in a section 0, current may not be conducted to all paths, in a section 1, first input current I1 may be conducted only to a first path, in a section 2, second input current I2 may be conducted only to a second path, in a section 3, third input current I3 may be conducted only to a third path, and in a section 4, fourth input current I4 may be conducted only to a fourth path.

Figure 6:
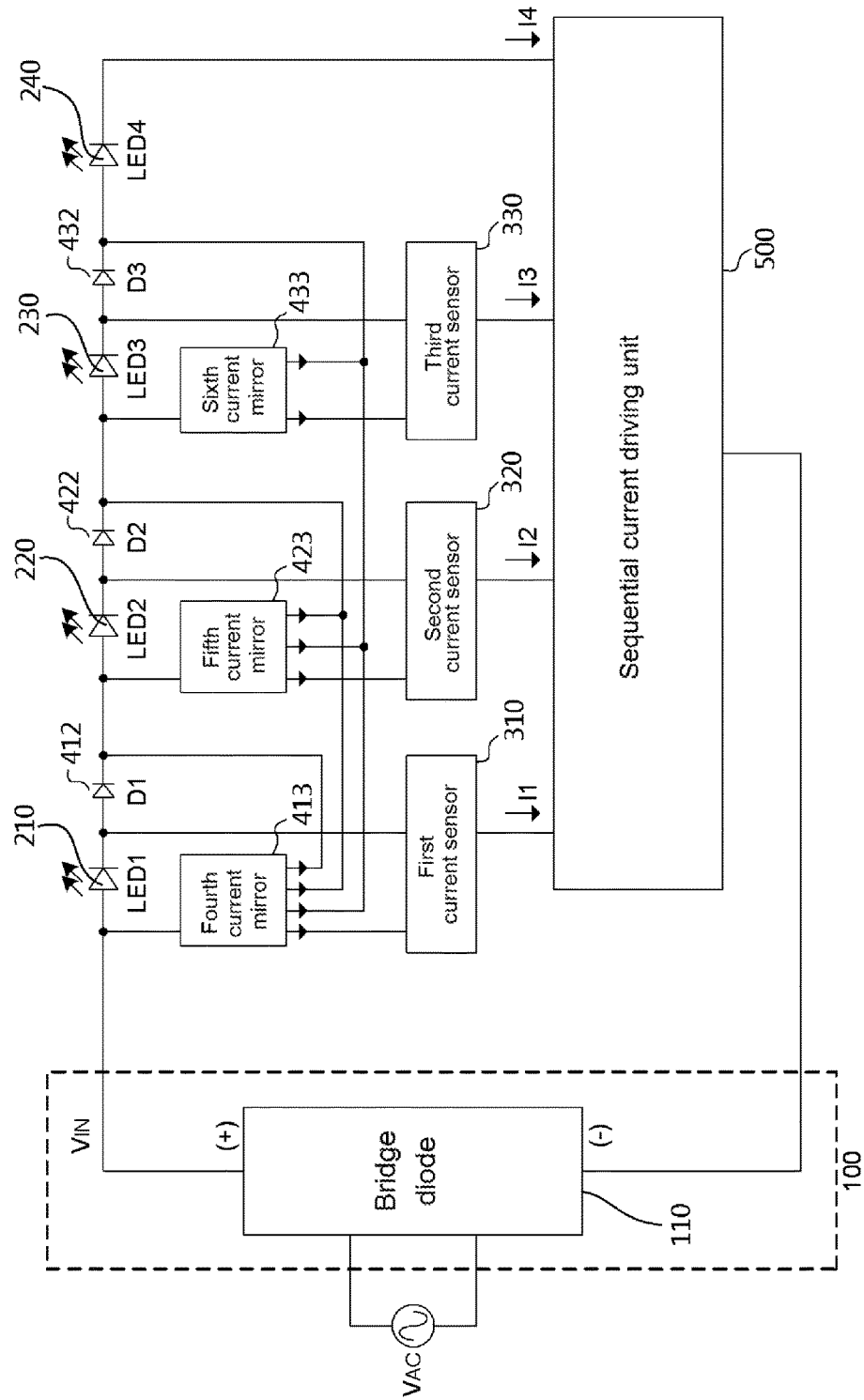
FIG. 6 is a view showing a parallel current mirror unit of the apparatus for synchronous driving of the multi-channel light emitting diodes according to the embodiment of the present invention.

FIG. 6 is a view showing in detail a parallel current mirror unit 400 of the apparatus for synchronous driving of the multi-channel light emitting diodes according to the embodiment of the present invention. The apparatus for synchronous driving of the multi-channel light emitting diodes of FIG. 6 differs from the apparatus for synchronous driving of the multi-channel light emitting diodes of FIG. 5 in a connection configuration of the current mirror unit 400, components which perform similar functions are denoted by the same reference numerals as those in FIG. 5, and descriptions thereof will be omitted for the sake of convenience.

First, a fourth current mirror 413 is connected to the anode of the first light emitting diode 210 through a first terminal thereof, connected to the second terminal of the first current sensor 310 through a second terminal thereof, connected to the cathode of the first diode 412 and to the anode of the second light emitting diode 220 through a third terminal thereof, connected to the anode of the third light emitting diode 230 and to a third terminal of a fifth current mirror 423 through a fourth terminal thereof, and connected to the anode of the fourth light emitting diode 240, to a fourth terminal of the fifth current mirror 423 and to a third terminal of a sixth current mirror 433 through a fifth terminal thereof. Herein, the fourth current mirror 413 mirrors the current sensed by the first current sensor 310, in other words, mirrors current flowing in the first light emitting diode 210 and transmits the mirrored current to the second light emitting diode 220, to the third light emitting diode 230, and to the fourth light emitting diode 240. The mirrored current has the same level as the current flowing in the first light emitting diode 210, but is not limited thereto. The mirrored current may have a proportional relationship to the current flowing in the first light emitting diode 210.

In addition, the fifth current mirror 423 is connected to the anode of the second light emitting diode 220 through a first terminal thereof, connected to the second terminal of the second current sensor 320 through a second terminal thereof, connected to the cathode of the second diode 422, to the anode of the third light emitting diode 230 and to the fourth terminal of the fourth current mirror 413 through the third terminal thereof, and connected to the fifth terminal of the fourth current mirror 413, to the third terminal of the sixth current mirror 433 and to the anode of the fourth light emitting diode 240 through the fourth terminal thereof. Herein, the fifth current mirror 423 mirrors the current sensed by the second current sensor 320, in other words, mirrors current flowing in the second light emitting diode 220 and transmits the mirrored current to the third light emitting diode 230 and to the fourth light emitting diode 240. The mirrored current has the same level as the current flowing in the second light emitting diode 220, but is not limited thereto, the mirrored current may have a proportional relationship to the current flowing in the second light emitting diode 220.

Meanwhile, the sixth current mirror 433 is connected to the anode of the third light emitting diode 230 through a first terminal thereof, connected to the second terminal of the third current sensor 330 through a second terminal thereof, connected to the cathode of the third diode 432, to the anode of the fourth light emitting diode 240, to the fifth terminal of the fourth current mirror 41, and to the fourth terminal of the fifth current mirror 423 through the third terminal thereof. Herein, the sixth current mirror 433 mirrors the current sensed by the third current sensor 330, in other words, mirrors current flowing in the third light emitting diode 230 and transmits the mirrored current to the fourth light emitting diode 240. The mirrored current has the same level as the current flowing in the third light emitting diode 230, but is not limited thereto. The mirrored current may have a proportional relationship to the current flowing in the third light emitting diode 230.

Figure 7:
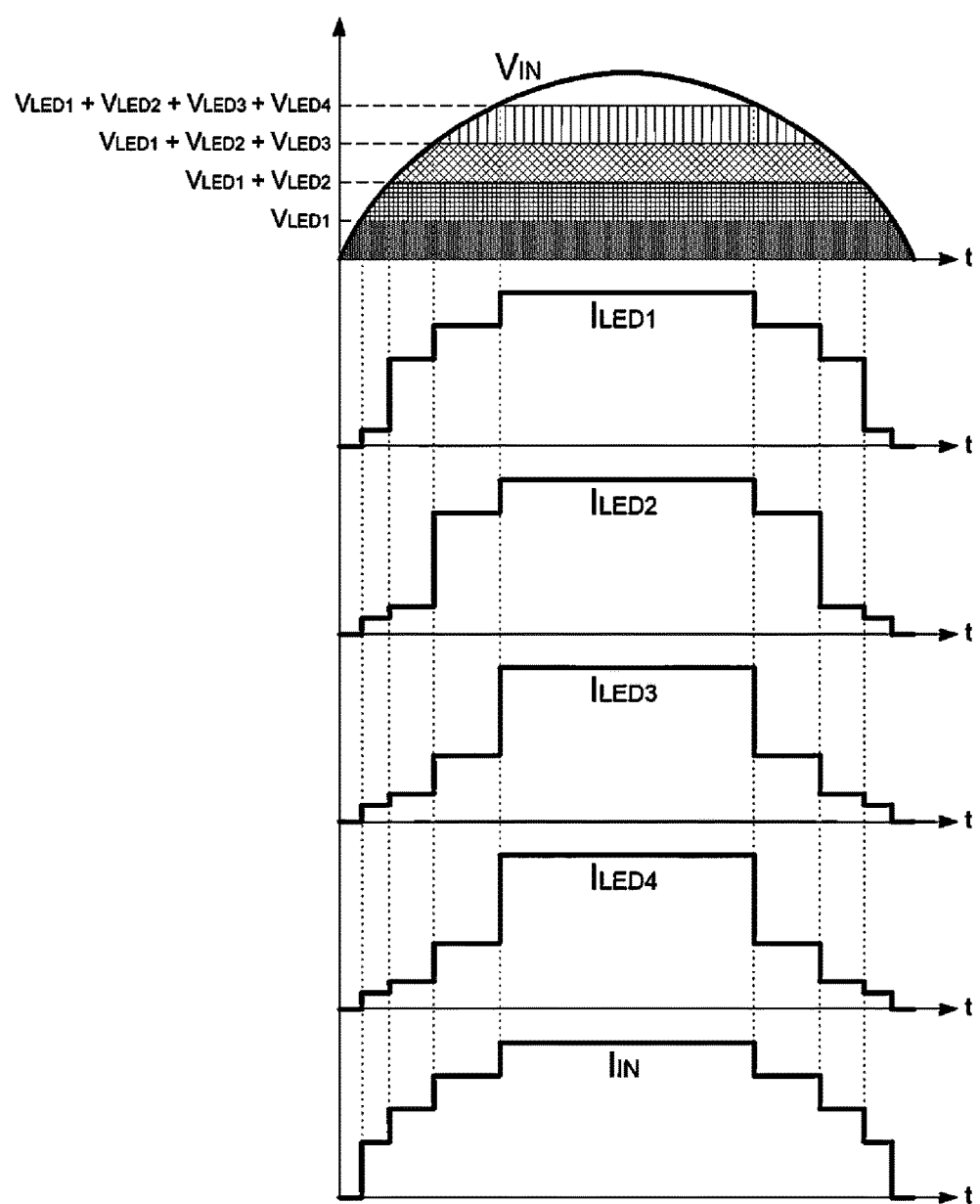
FIG. 7 is a graph showing an operation of the apparatus for synchronous driving of the multi-channel light emitting diodes according to the embodiment of the present invention.

FIG. 7 is a graph showing an operation of the apparatus for synchronous driving of the multi-channel light emitting diodes according to the embodiment of the present invention. Referring to FIGS. 4 to 7, an operation method of the apparatus for synchronous driving of the multi-channel light emitting diodes according to the embodiment of the present invention in which all light emitting diodes 210, 220, 230, and 240 are driven to emit light even though a low voltage corresponding to a degree slightly exceeding a driving voltage $V_{LED1}$ of the first light emitting diode 210 is input as an input voltage $V_{IN}$ will be described. Herein, voltage values and current values within the graph are sufficient to indicate the operation of the present invention, and the detailed values are not important, thus the units and numerical values are omitted. However, the ranges and units of preferred values will be apparent to those skilled in the art.

First, when the input voltage $V_{IN}$ is less than the driving voltage $V_{LED1}$ of the first light emitting diode 210, in other words, less than a minimum turn-on voltage, all light emitting diodes 210, 220, 230, and 240 are turned off since driving current $I_{IN}$ does not flow in the sequential current driving 500.

Meanwhile, when the input voltage $V_{IN}$ is equal or greater than the driving voltage $V_{LED1}$ of the first light emitting diode 210 and is equal to or less than a sum of the driving voltage $V_{LED1}$ of the first light emitting diode 210 and a driving voltage $V_{LED2}$ of the second light emitting diode 220 ($V_{LED1}+V_{LED2}$), first input current I1 flows in the first light emitting diode 210 since a first path of the sequential current driving 500 is conducted.

Herein, the current flowing in the first light emitting diode 210 is sensed by the first current sensor 310, and the sensed current is mirrored by the first current mirror 411. Thus, the mirrored current flows in the second light emitting diode 220.

In addition, the current flowing in the second light emitting diode 220 is sensed by the second current sensor 320, and the sensed current is mirrored by the second current mirror 421. Thus, the mirrored current flows in the third light emitting diode 230.

Further, the current flowing in the third light emitting diode 230 is sensed by the third current sensor 330, and the sensed current is mirrored by the third current mirror 431. Thus, the mirrored current flows in the fourth light emitting diode 240.

Therefore, when the input voltage $V_{IN}$ is equal or greater than the driving voltage $V_{LED1}$ of the first light emitting diode 210 and is equal to or less than the sum of the driving voltage $V_{LED1}$ of the first light emitting diode 210 and the driving voltage $V_{LED2}$ of the second light emitting diode 220 ($V_{LED1}+V_{LED2}$), as the case where four light emitting diodes 210, 220, 230, and 240 are connected in parallel, all light emitting diodes 210, 220, 230, and 240 may be turned on since the first light emitting diode 210 is driven to emit light by first driving current $I_{LED1}$, the second light emitting diode 220 is to emit light by driving current $I_{LED2}$, the third light emitting diode 230 is driven to emit light by third driving current $I_{LED3}$, and the fourth light emitting diode 240 is to emit light by fourth driving current $I_{LED4}$.

In addition, when the input voltage $V_{IN}$ is greater than the sum of the driving voltage $V_{LED1}$ of the first light emitting diode 210 and the driving voltage $V_{LED2}$ of the second light emitting diode 220 ($V_{LED1}+V_{LED2}$) and is equal to or less than a sum of the driving voltage $V_{LED1}$ of the first light emitting diode 210 to a third driving voltage $V_{LED3}$ of the third light emitting diode 230 ($V_{LED1}+V_{LED2}+V_{LED3}$), second input current I2 flows since the first path of the sequential current driving 500 is blocked, and a second path thereof is conducted. Thus, the second input current I2 flows in the first light emitting diode 210 and in the second light emitting diode 220.

Herein, the current flowing in the second light emitting diode 220 is sensed by the second current sensor 320, and the sensed current is mirrored by the second current mirror 421. Thus, the mirrored current flows in the third light emitting diode 230.

Meanwhile, the current flowing in the third light emitting diode 230 is sensed by the third current sensor 330, and the sensed current is mirrored by the third current mirror 431. Thus, the mirrored current flows in the fourth light emitting diode 240.

Therefore, when the input voltage $V_{IN}$ is greater than the sum of the driving voltage $V_{LED1}$ of the first light emitting diode 210 and the driving voltage $V_{LED2}$ of the second light emitting diode 220 ($V_{LED1}+V_{LED2}$) and is equal to or less than the sum of the driving voltage $V_{LED1}$ of the first light emitting diode 210 to the third driving voltage $V_{LED3}$ of the third light emitting diode 230 ($V_{LED1}+V_{LED2}+V_{LED3}$), as the case where three light emitting diodes, 220, 230, and 240 are connected in parallel and the first light emitting diode 210 serially connected thereto, all light emitting diodes 210, 220, 230, and 240 may be turned on since the first light emitting diode 210 is driven to emit light by first driving current $I_{LED1}$, the second light emitting diode 220 is driven to emit light by second driving current $I_{LED2}$, the third light emitting diode 230 is driven to emit light by third driving current $I_{LED3}$, and the fourth light emitting diode 240 is driven to emit light by fourth driving current $I_{LED4}$. In other words, the current flowing in the second light emitting diode 220 may be regenerated to drive the third light emitting diode 230 and the fourth light emitting diode 240 within a section in which the third light emitting diode 230 and the fourth light emitting diode 240 are not capable of emitting light according to a conventional circuit.

In addition, when the input voltage $V_{IN}$ is greater than the sum of the driving voltage $V_{LED1}$ of the first light emitting diode 210 to the driving voltage $V_{LED3}$ of the third light emitting diode 230 ($V_{LED1}+V_{LED2}+V_{LED3}$) and is equal to or less than a sum of the driving voltage $V_{LED1}$ of the first light emitting diode 210 to a driving voltage $V_{LED4}$ of the fourth light emitting diode 240 ($V_{LED1}+V_{LED2}+V_{LED3}+V_{LED4}$), third input current I3 flows since the first path and the second path of the sequential current driving 500 are blocked, and a third path thereof is conducted. Thus, the third input current I3 flows in the first light emitting diode 210 to the third light emitting diode 230.

Herein, the current flowing in the third light emitting diode 230 is sensed by the third current sensor 330, and the sensed current is mirrored by the third current mirror 431. Thus, the mirrored current flows in the fourth light emitting diode 240.

Therefore, when the input voltage $V_{IN}$ is greater than the sum of the driving voltage $V_{LED1}$ of the first light emitting diode 210 to the driving voltage VLED3 of the third light emitting diode 230 ($V_{LED1}+V_{LED2}+V_{LED3}$) and is equal to or less than the sum of the driving voltage $V_{LED1}$ of the first light emitting diode 210 to the driving voltage $V_{LED4}$ of the fourth light emitting diode 240 ($V_{LED1}+V_{LED2}+V_{LED3}+V_{LED4}$), as the case where two light emitting diodes 230 and 240 are connected in parallel and the first light emitting diode 210 and the second light emitting diode 220 are serially connected thereto, all light emitting diodes 210, 220, 230, and 240 may be turned on since the first light emitting diode 210 is driven to emit light by first driving current $I_{LED1}$, the second light emitting diode 220 is driven to emit light by second driving current $I_{LED2}$, the third light emitting diode 230 is driven to emit light by third driving current $I_{LED3}$, and the fourth light emitting diode 240 is driven to emit light by fourth driving current $I_{LED4}$. In other words, the current flowing in the third light emitting diode 230 may be regenerated to drive the fourth light emitting diode 240 within a section in which the fourth light emitting diode 240 is not capable of being operated according to a conventional circuit.

In addition, when the input voltage $V_{IN}$ is greater than the sum of the driving voltage $V_{LED1}$ of the first light emitting diode 210 to the driving voltage $V_{LED4}$ of the fourth light emitting diode 240 ($V_{LED1}+V_{LED2}+V_{LED3}+V_{LED4}$), the first path to the third path of the sequential current driving 500 are blocked, and a fourth path thereof is conducted, and fourth input current I4 flows therein. Thus, fourth input current I4 flows in the first light emitting diode 210 to the fourth light emitting diode 240 and all current sensors 310, 320 and 330 and all current mirrors 411, 421 and 431 are not operated.

In other words, as described above, the apparatus for synchronous driving of the multi-channel light emitting diodes according to the embodiment of the present invention may perform an operation similar to changing connection states of a plurality of light emitting diodes according to an input voltage level.

Meanwhile, when the apparatus for synchronous driving of the multi-channel light emitting diodes operates as the case where a part of the plurality of light emitting diodes are connected in parallel, currents levels $I_{LED1}$ to $I_{LED4}$ flowing in respective light emitting diodes may be changed by adjusting the plurality of current sensors 310, 320 and 330 and the plurality of current mirrors 411, 421 and 431.

For example, when all light emitting diodes 210, 220, 230 and 240 are driven to emit light as being connected in parallel with each other according to the input voltage $V_{IN}$, the mirrored current that is transmitted from the first light emitting diode 210 to the second light emitting diode 220 may have a current value corresponding to three times that of the first input current I1, the mirrored current that is transmitted from the second light emitting diode 220 to the third light emitting diode 230 may have a current value corresponding to two times that of the second input current I2, and the mirrored current that is transmitted from the third light emitting diode 230 to the fourth light emitting diode 240 may have a current value corresponding to the third input current I3.

Meanwhile, a power factor characteristic of the apparatus for synchronous driving of the multi-channel light emitting diodes according to the embodiment of the present invention is determined by the input current levels I1 to I4 that are preset in the sequential current driving unit 500 and is not influenced by the current sensor unit 300 and the current mirror 400 since the sequential current driving unit 500 determines the final current to be flowed.

Therefore, the current levels $I_{LED1}$ to $I_{LED4}$ respectively flowing in the plurality of light emitting diodes 210, 220, 230, and 240 may be adjusted according to the input voltage level by adjusting the levels of the input currents I1 to I4 that are preset in the sequential current driving unit 500. Herein, a power factor value varies according to the input current levels I1 to I4 that are preset in the sequential current driving unit 500.

Figure 8:
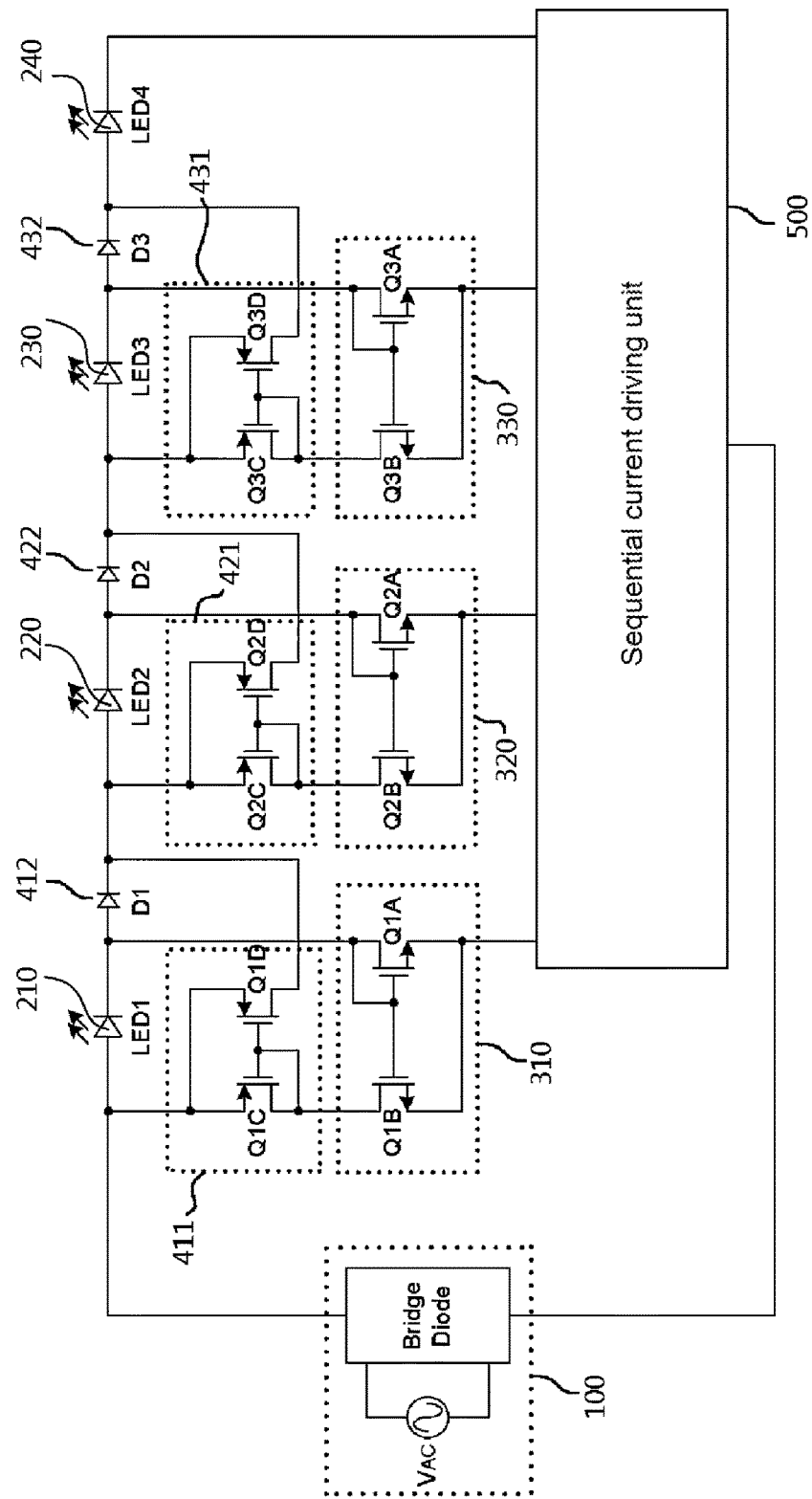
FIG. 8 is a view showing a first example of a current mirror and a current sensor of the apparatus for synchronous driving of the multi-channel light emitting diodes shown in FIG. 5.

FIG. 8 is a view showing a first example of the current mirrors 411, 421, and 431 and the current sensors 310, 320, and 330 of the apparatus for synchronous driving of the multi-channel light emitting diodes according to the embodiment of the present invention. As shown in FIG. 8, the current sensors 310, 320, and 330 use current mirror circuits, each of the mirror circuits may be configured with an N-type MOSFET or a NPN transistor, and the current mirrors 411, 421, and 431 uses current mirror circuits, each of the mirror circuits may be configured with a P-type MOSFET or a PNP transistor, but it is not limited thereto.

Figure 9:
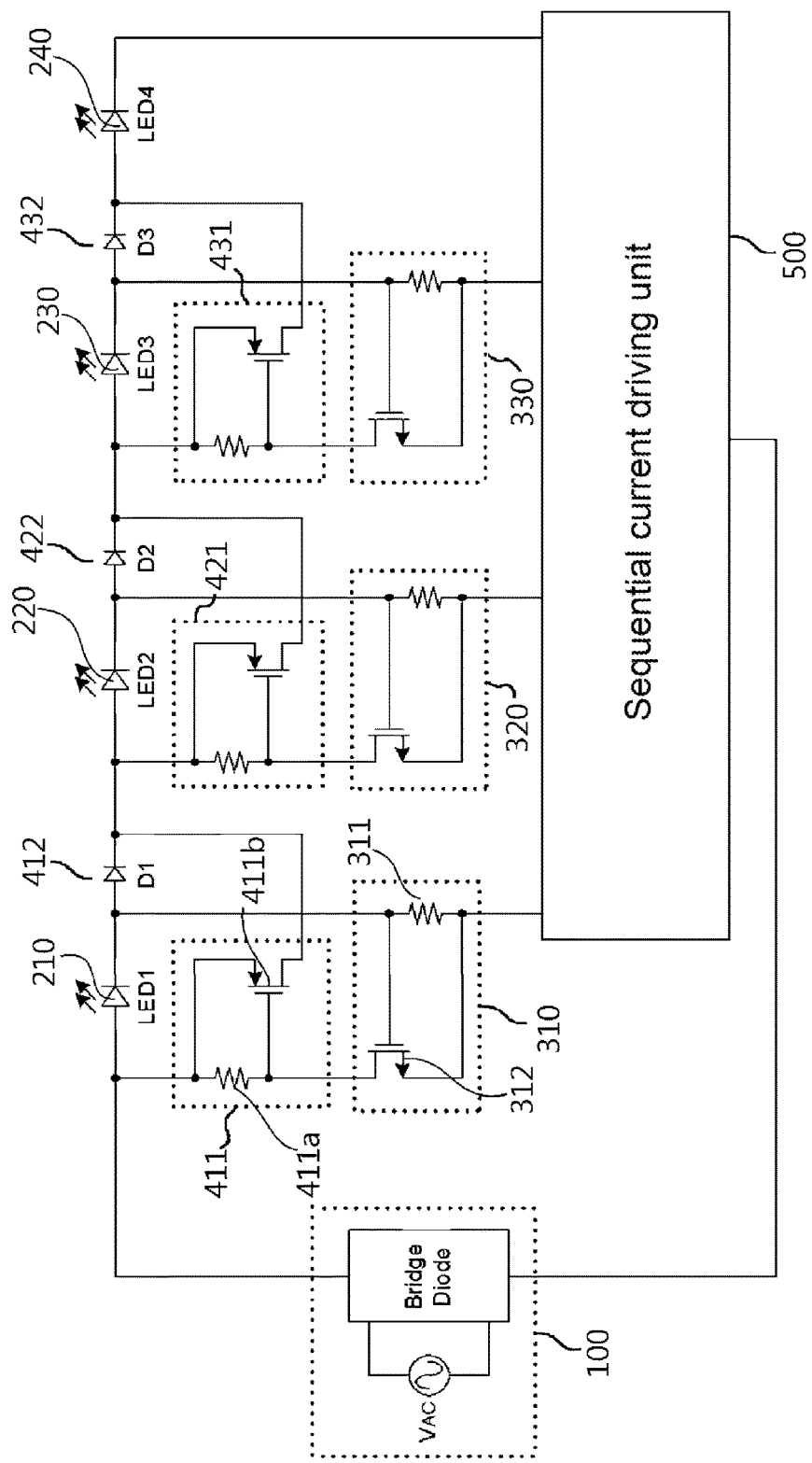
FIG. 9 is a view showing a second example of the current mirror and the current sensor of the apparatus for synchronous driving of the multi-channel light emitting diodes shown in FIG. 5.

FIG. 9 is a view showing a second example of the current mirrors 411, 421, and 431 and the current sensors 310, 320, and 330 of the apparatus for synchronous driving of the multi-channel light emitting diodes according to the embodiment of the present invention. As shown in FIG. 9, the current sensors 310, 320, and 330 use current mirror circuits each of the current mirror circuits may be configured with a resistor and an N-type MOSFET or an NPN transistor, and the current mirrors 411, 421, and 431 use current mirror circuits, each of the current mirror circuits may be configured with a resistor and a P-type MOSFET or an PNP transistor, but it is not limited thereto.

Herein, the current sensor 310 may include a first sensing resistor 311 and a first transistor 312 that is N-type MOSFET. In other words, the first sensing resistor 311 may be connected to the cathode of the first light emitting diode 210 through a first terminal thereof and connected to the sequential current driving unit 500 through a second terminal thereof. Alternatively, the first transistor 312 may be connected to the first terminal of the first sensing resistor 311 through a gate thereof, connected to second terminal of first sensing resistor 311 through a source terminal thereof and connected to the current mirror 411 through a drain terminal thereof.

Meanwhile, the current mirror 411 may include a second sensing resistor 411*a* and a second transistor 411*b* that is P-type MOSFET. In other words, the second sensing resistor 411*a* may be connected to the anode of the first light emitting diode 210 through a first terminal thereof and connected to the drain terminal of the first transistor 312 through a second terminal thereof. Alternatively, the second transistor 411*b* may be connected to the second terminal of the second sensing resistor 411*a* through a gate thereof, connected to the first terminal of the second sensing resistor 411*a* through a source terminal thereof and connected to the anode of the second light emitting diode 220 through a drain terminal thereof.

Figure 10:
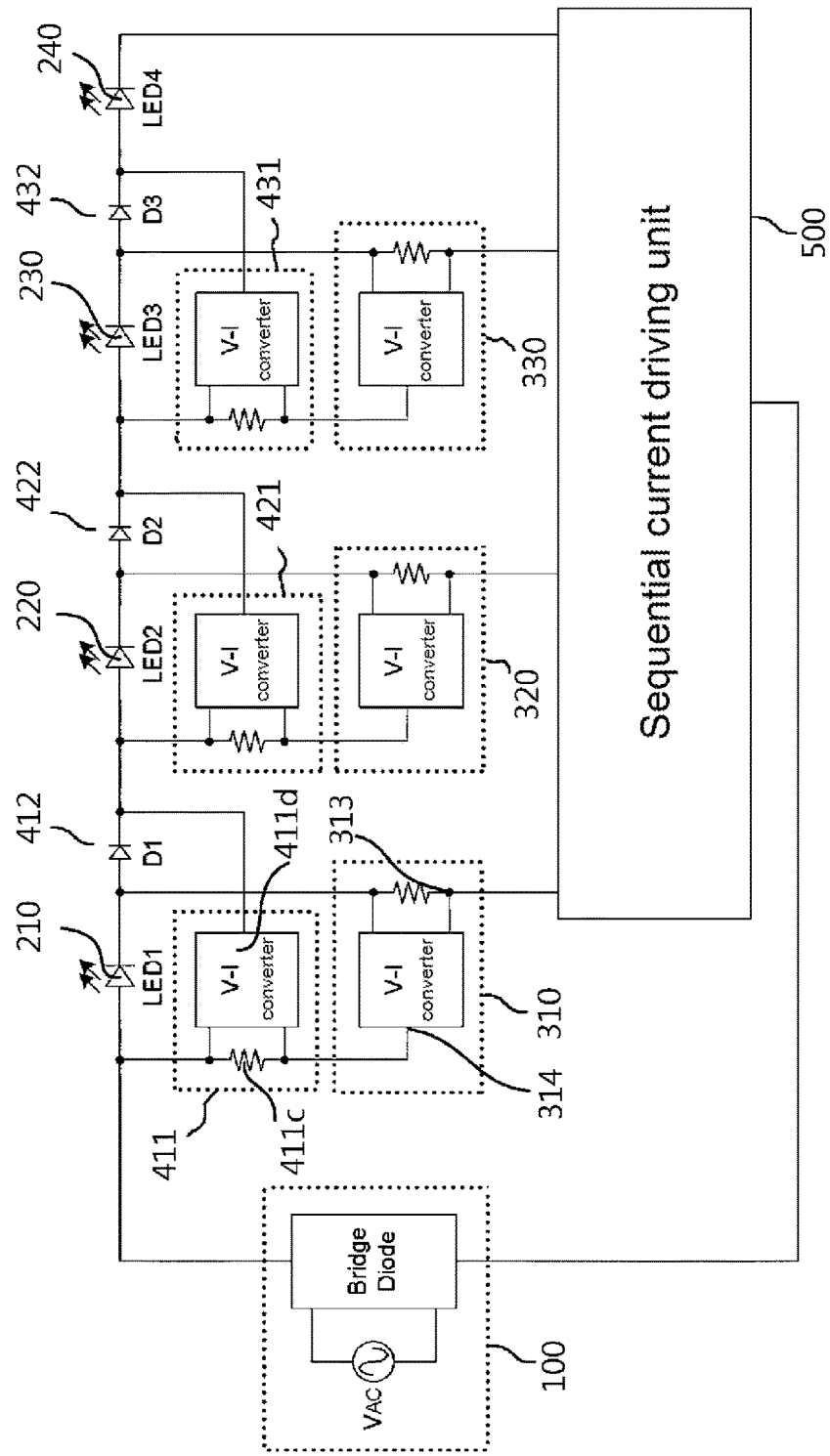
FIG. 10 is a view showing a third example of the current mirror and the current sensor of the apparatus for synchronous driving of the multi-channel light emitting diodes shown in FIG. 5.

FIG. 10 is a view showing a third example of the current mirrors 411, 421, and 431 and the current sensors 310, 320, and 330 of the apparatus for synchronous driving of the multi-channel light emitting diodes according to the embodiment of the present invention. Each of the current sensors 310, 320, and 330 may use a resistor and a voltage-current converter, and each of the current mirrors 411, 421, and 431 may also use a resistor and a voltage-current converter, but it is not limited thereto.

Herein, the current sensor 310 may include a third sensing resistor 313 and a first voltage-current converter 314. In other words, the third sensing resistor 313 may be connected to the cathode of the first light emitting diode 210 through a first terminal thereof and connected to the sequential current driving unit 500 through a second terminal thereof. Alternatively, the first voltage-current converter 314 may be connected to the first terminal of the third sensing resistor 313 through a first terminal thereof, connected to the second terminal of the third sensing resistor 313 through a second terminal thereof and connected to the current mirror 411 through a third terminal thereof. Thus, the first voltage-current converter 314 may convert a voltage applied to the third sensing resistor 313 to current, and transmit the converted current to the current mirror 411.

Meanwhile, the current mirror 411 may include a fourth sensing resistor 411*c* and a second voltage-current converter 411*d*. In other words, the fourth sensing resistor 411*c* may be connected to the anode of the first light emitting diode 210 through a first terminal thereof and connected to the third terminal of the first voltage-current converter 314 through a second terminal thereof. Alternatively, the second voltage-current converter 411*d* may be connected to the first terminal of the fourth sensing resistor 411*c* through a first terminal thereof, connected to the second terminal of the fourth sensing resistor 411*c* through a second terminal thereof and connected to the anode of the second light emitting diode 220 through a third terminal thereof. Thus, the second voltage-current converter 411*d* may convert a voltage applied to the fourth sensing resistor 411*c* to current, and transmit the converted current to the second light emitting diode 220.

Figure 11:
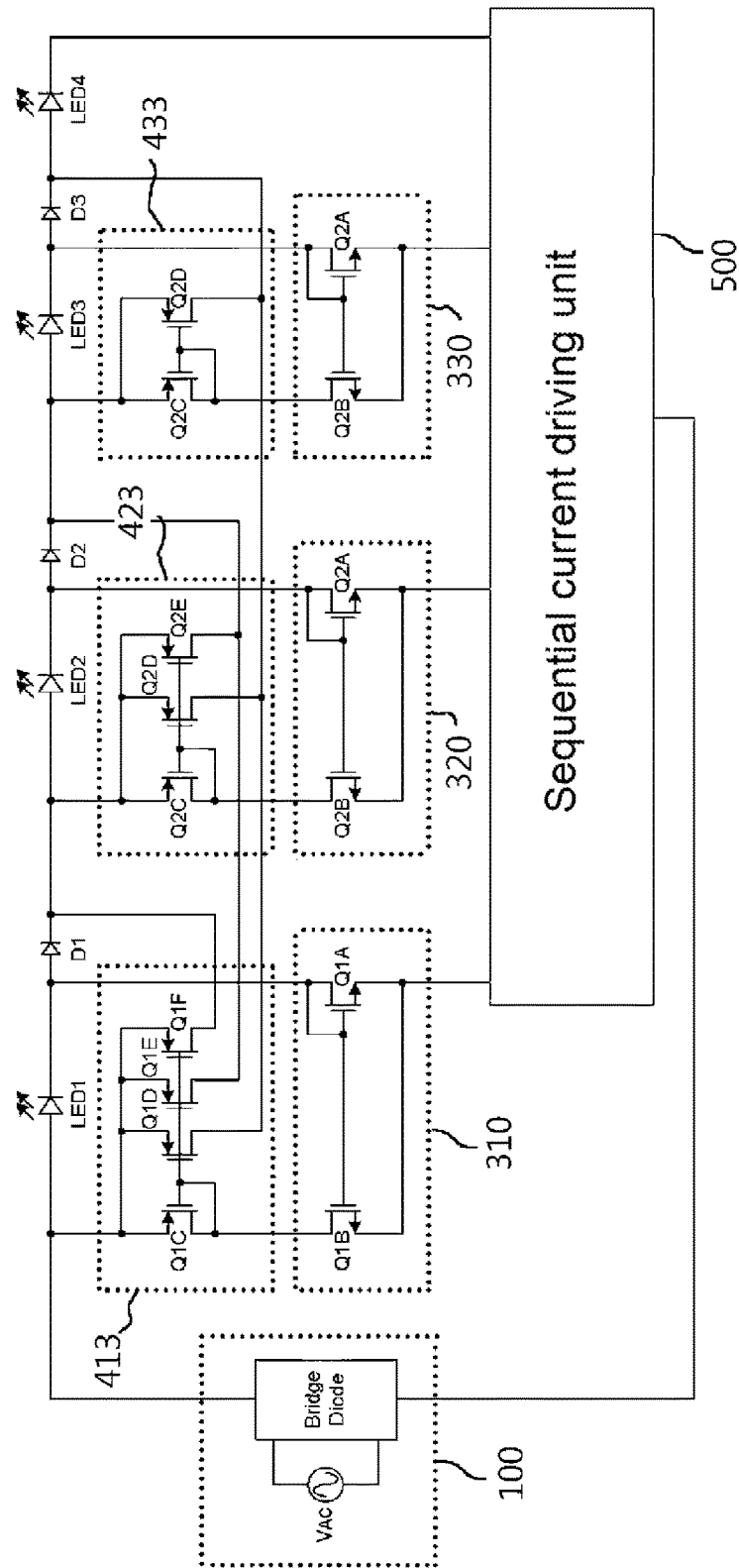
FIG. 11 is a view showing an example of a current mirror and a current sensor of the apparatus for synchronous driving of the multi-channel light emitting diodes shown in FIG. 6.
Figure 12A:
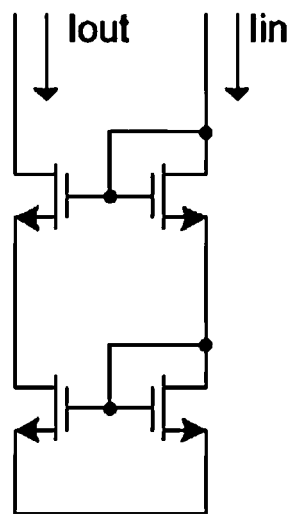
FIGS. 12A to 12E are views showing examples of a current sensor of the apparatus for synchronous driving of the multi-channel light emitting diodes according to the embodiment of the present invention.
Figure 12B:
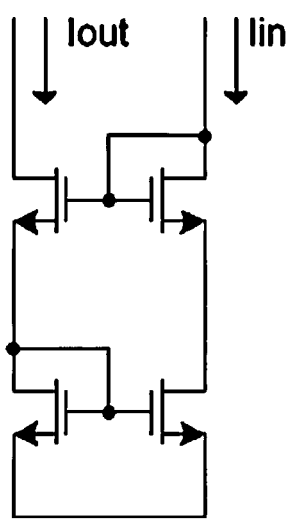
Figure 12C:
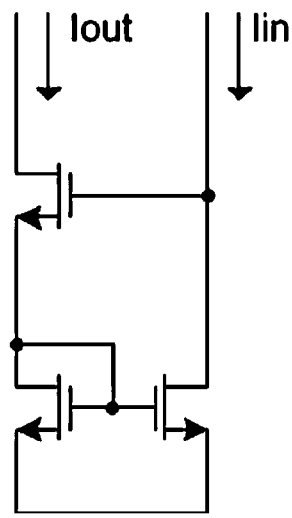
Figure 12D:
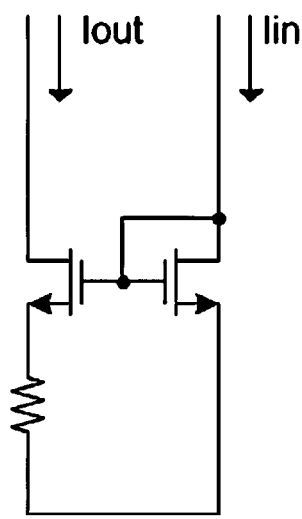
Figure 12E:
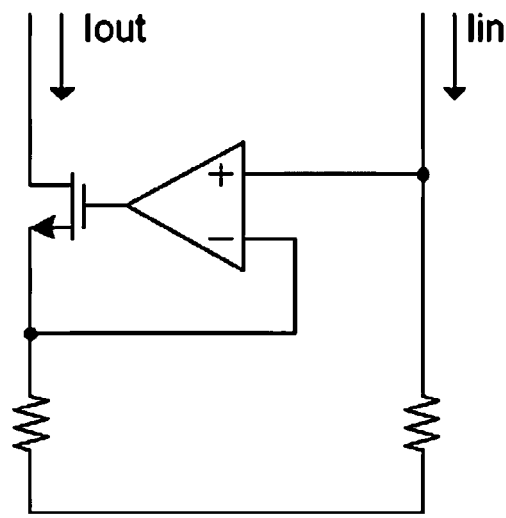
Figure 13A:
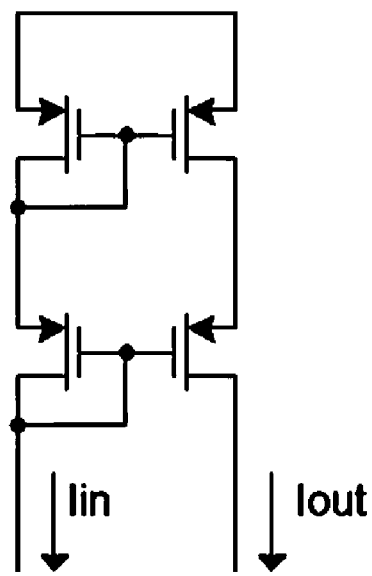
FIGS. 13A to 13E are views showing examples of a current mirror of the apparatus for synchronous driving of the multi-channel light emitting diodes according to the embodiment of the present invention.
Figure 13B:
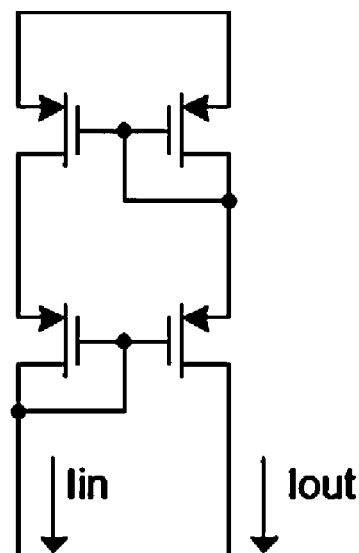
Figure 13C:
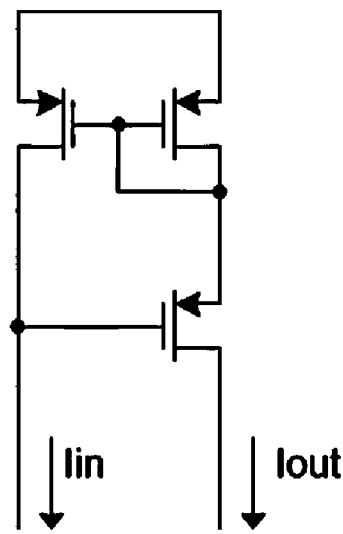
Figure 13D:
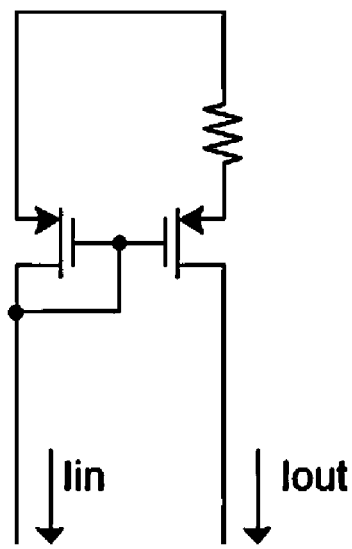
Figure 13E:
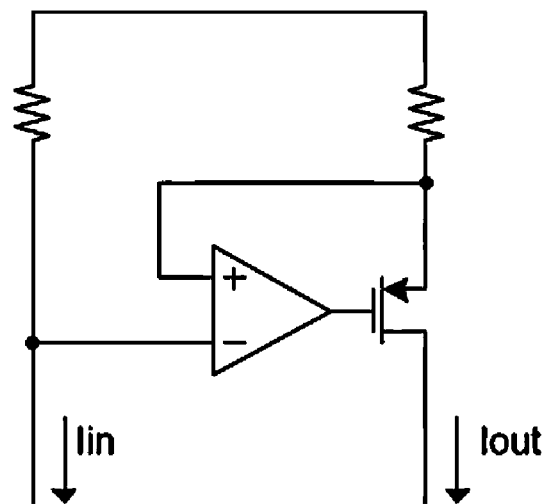

FIG. 11 is a view showing an example of a parallel current mirror unit 400 and showing the current mirrors 413, 423, and 433 and the current sensors 310, 320, and 330 of the apparatus for synchronous driving of the multi-channel light emitting diodes according to the embodiment of the present invention. As shown in FIG. 11, the current sensors 310, 320, and 330 may use current mirror circuits, each of the current mirror circuit is configured with an N-type MOSFET, and the current mirrors 413, 423, and 433 may use current mirror circuits that are connected in parallel, each of the current mirror circuit is configured with a P-type MOSFET. Accordingly, the mirrored currents that are respectively mirrored in the current mirrors 413, 423, and 433 may be provided to the light emitting diodes that are respectively connected to the current mirrors 413, 423, and 433.

Herein, a MOSFET is used for the current mirrors 413, 423, and 433 and the current sensors 310, 320, and 330 for convenience. However, a cascade form and a Darlington form may be used by using a junction transistor BJT and MOSFET, and the transistor used for the configuration element is not limited thereto, and may be selected from an insulated gate bipolar transistor IGBT, a junction transistor BJT, and a junction field effect transistor JFET.

FIGS. 12A to 12E are views showing examples of the current sensors 310, 320, and 330 of the apparatus for synchronous driving of the multi-channel light emitting diodes according to the embodiment of the present invention. Each of the current sensors 310, 320, and 330 may use a circuit that senses current Iin flowing in the light emitting diode and generates output current that is proportional to the current Iin. A cascode current mirror circuit shown in FIG. 12A, a Wilson current mirror circuit shown in FIGS. 12B and 12C, a Widlar current mirror circuit shown in FIG. 12D, and an amplifier shown in FIG. 12E may be used.

FIGS. 13A to 13E are views showing examples of the current mirrors 411, 413, 421, 423, 431, and 433 of the apparatus for synchronous driving of the multi-channel light emitting diodes according to the embodiment of the present invention. Each of the current mirrors 411, 413, 421, 423, 431, and 433 may use a circuit that generates current Iout that is proportional to the current Iin sensed by the current sensors 310, 320, and 330 and provides to the light emitting diode connected thereto. The circuit may be a circuit that is complementary to the current sensors 310, 320, and 330, and a cascode current mirror shown in FIG. 13A, a Wilson current mirror circuit shown in FIGS. 13B and 13C, a Widlar current mirror circuit shown in FIG. 13D, and an amplifier shown in FIG. 13E may be used.

Figure 14:
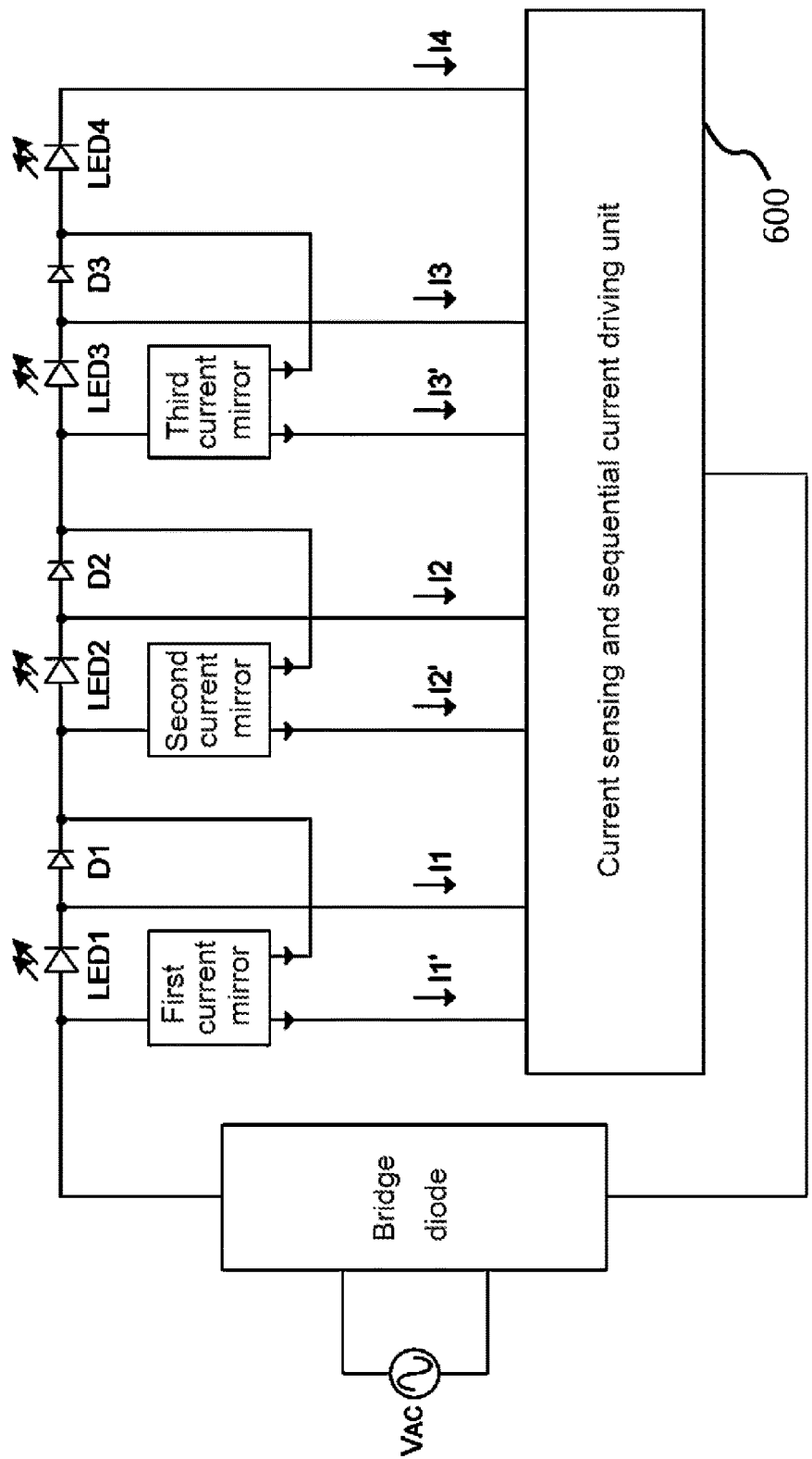
FIG. 14 is a view showing an apparatus for synchronous driving of multi-channel light emitting diodes according to another embodiment of the present invention.

FIG. 14 is a view showing an apparatus for synchronous driving of multi-channel light emitting diodes according to another the embodiment of the present invention. The apparatus for synchronous driving of the multi-channel light emitting diodes according to another the embodiment of the present invention includes a current sensing and sequential current driving unit 600 that performs all function of the current sensor unit 300 and the sequential current driving unit 500 of the apparatus for synchronous driving of the multi-channel light emitting diodes of FIG. 4. Herein, the remaining configuration except for the current sensor unit 300 and the sequential current driving unit 400 are similar to the configuration shown in FIG. 5, the reference numerals and detailed description thereof will be omitted for the sake of convenience.

The current detection and sequential current driving unit 600 senses current flowing in the multi-channel light emitting diode unit 200 and transmits the sensed current to the current mirror unit 400. The functions of the current sensor unit 300 and the sequential current driving unit 500 may be combined and formed in various forms, and are described below.

Figure 15:
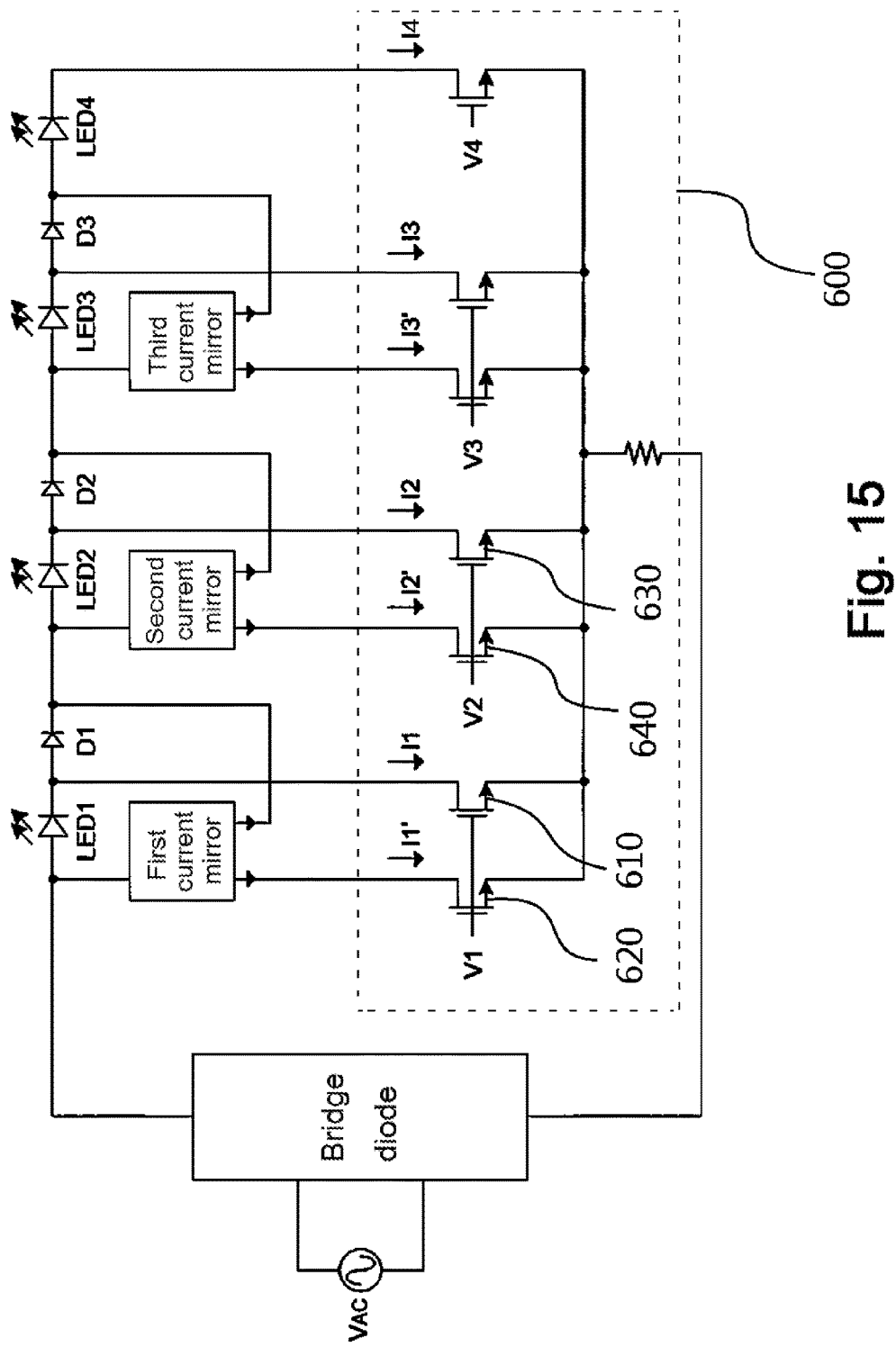
FIG. 15 is a view showing a first example of a current sensing and sequential current driving unit of the apparatus for synchronous driving of the multi-channel light emitting diodes according to another embodiment of the present invention.

FIG. 15 is a view showing a first example of the current sensing and sequential current driving unit 600 of the apparatus for synchronous driving of the multi-channel light emitting diodes according to another embodiment of the present invention. When the current sensing and sequential current driving unit 600 includes current driving MOSFETs 610 and 620 that conduct currents I1, I2, I3, and I4 input to drain terminals thereof to source terminals thereof by receiving gate voltages V1, V2, V3, and V4, the current sensing MOSFET 620 may be connected to the gate terminal and the source terminal of the current driving MOSFET 610 in parallel and sense currents I1', I2', and I3' (I1' in the embodiment of FIG. 15) that is proportional to current flowing in the first light emitting diode 210.

For example, a first current driving MOSFET 610 of the current sensing and sequential current driving unit 600 receives an input voltage having an input voltage level through a gate thereof, connected to the cathode of the first light emitting diode 210 through a drain terminal thereof and connected to the rectification unit 100 through a source terminal thereof, and is turned on according to a first input voltage V1. For example, when the input voltage level is equal to or greater than a driving voltage of the first light emitting diode 210 and is equal to or less than a sum of the driving voltage of the first light emitting diode 210 and a driving voltage of the second light emitting diode 220, the first current driving MOSFET 610 may be turned on and conduct first input current I1.

In addition, a first current sensing MOSFET 620 is connected to the gate of the first current driving MOSFET 610 through a gate thereof and connected to the source terminal of the first current driving MOSFET 610 through a source terminal thereof, and is turned on according to the first input voltage V1. For example, when the input voltage level is equal to or greater than the driving voltage of the first light emitting diode 210 and is equal to or less than the sum of the driving voltage of the first light emitting diode 210 and the driving voltage of the second light emitting diode 220, the first current sensing MOSFET 620 may be turned on and conduct sensed current I1'.

Meanwhile, a second current driving MOSFET 630 receives an input voltage through a gate thereof, connected to the cathode of the second light emitting diode 220 through a drain terminal thereof and connected to the rectification unit 100 through a source terminal thereof, and is turned on according to a second input voltage V2. For example, when the input voltage exceeds the sum of the driving voltage of the first light emitting diode 210 and the driving voltage of the second light emitting diode 220, the second current driving MOSFET 630 may be turned on and conduct second input current I2.

In addition, a second current sensing MOSFET 640 is connected to the gate of the second current driving MOSFET 630 through a gate thereof and connected to the source terminal of the second current driving MOSFET 630 through a source terminal thereof, and is turned on according to the second input voltage V2. For example, when the input voltage level exceeds the sum of the driving voltage of the first light emitting diode 210 and the driving voltage of the second light emitting diode 220, the second current sensing MOSFET 640 may be turned on and conduct sensed current I2'.

Figure 16:
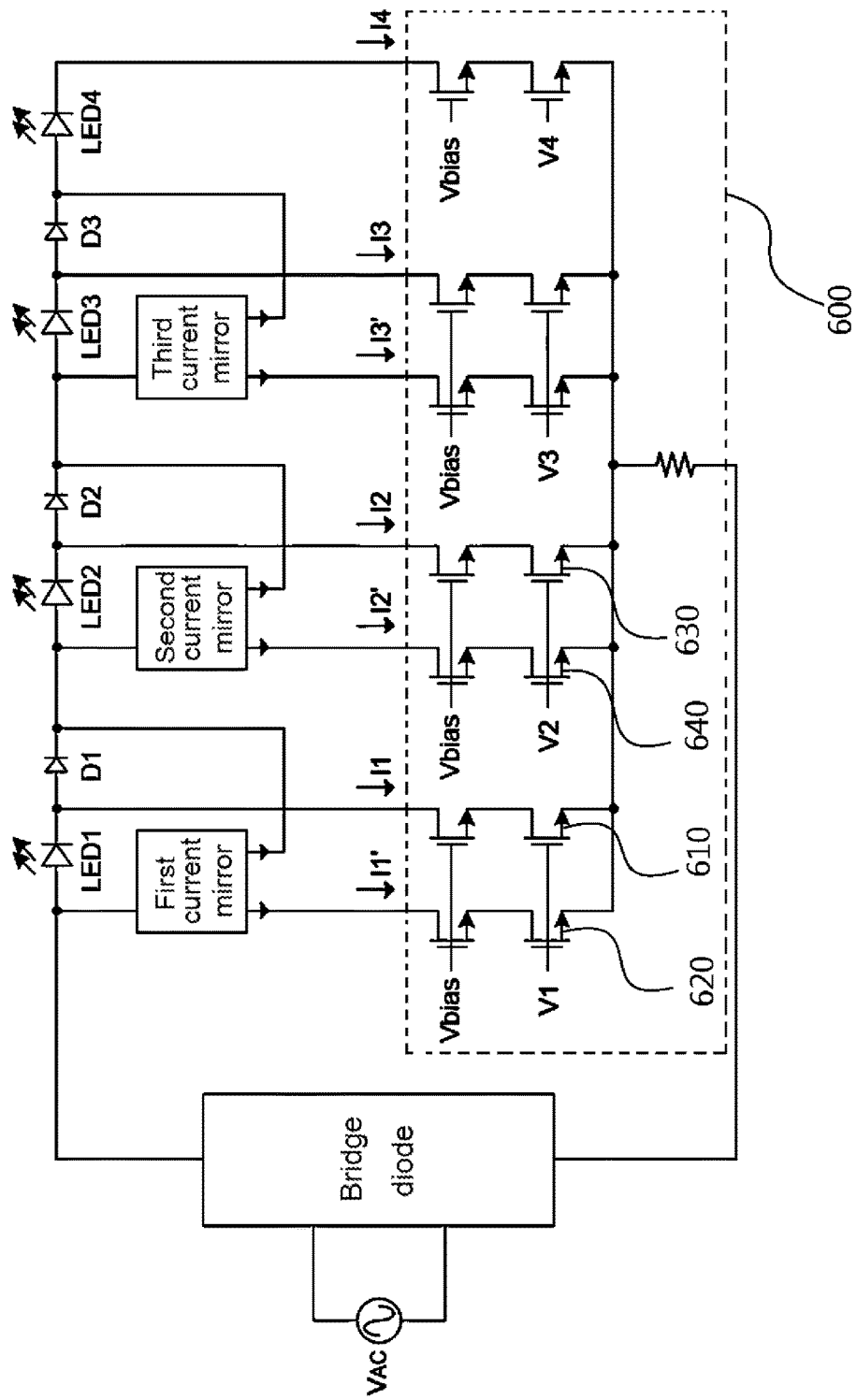
FIG. 16 is a view showing a second example of the current sensing and sequential current driving unit of the apparatus for synchronous driving of the multi-channel light emitting diodes according to another embodiment of the present invention.

FIG. 16 is a view showing a second example of the current sensing and sequential current driving unit 600 of the apparatus for synchronous driving of the multi-channel light emitting diodes according to another embodiment of the present invention. There is disclosed a circuit that uses the current driving MOSFET and the current sensing MOSFET in a cascode form to improve a current sensing characteristic.

As shown in FIG. 16, a cascode circuit may be formed by serially and respectively arranging bias MOSFETs to the first current driving MOSFET 610, the second current driving MOSFET 630, the first current sensing MOSFET 620, and the second current sensing MOSFET 640, and bias voltages Vbias may be respectively applied to gates of the bias MOSFETs.

Figure 17:
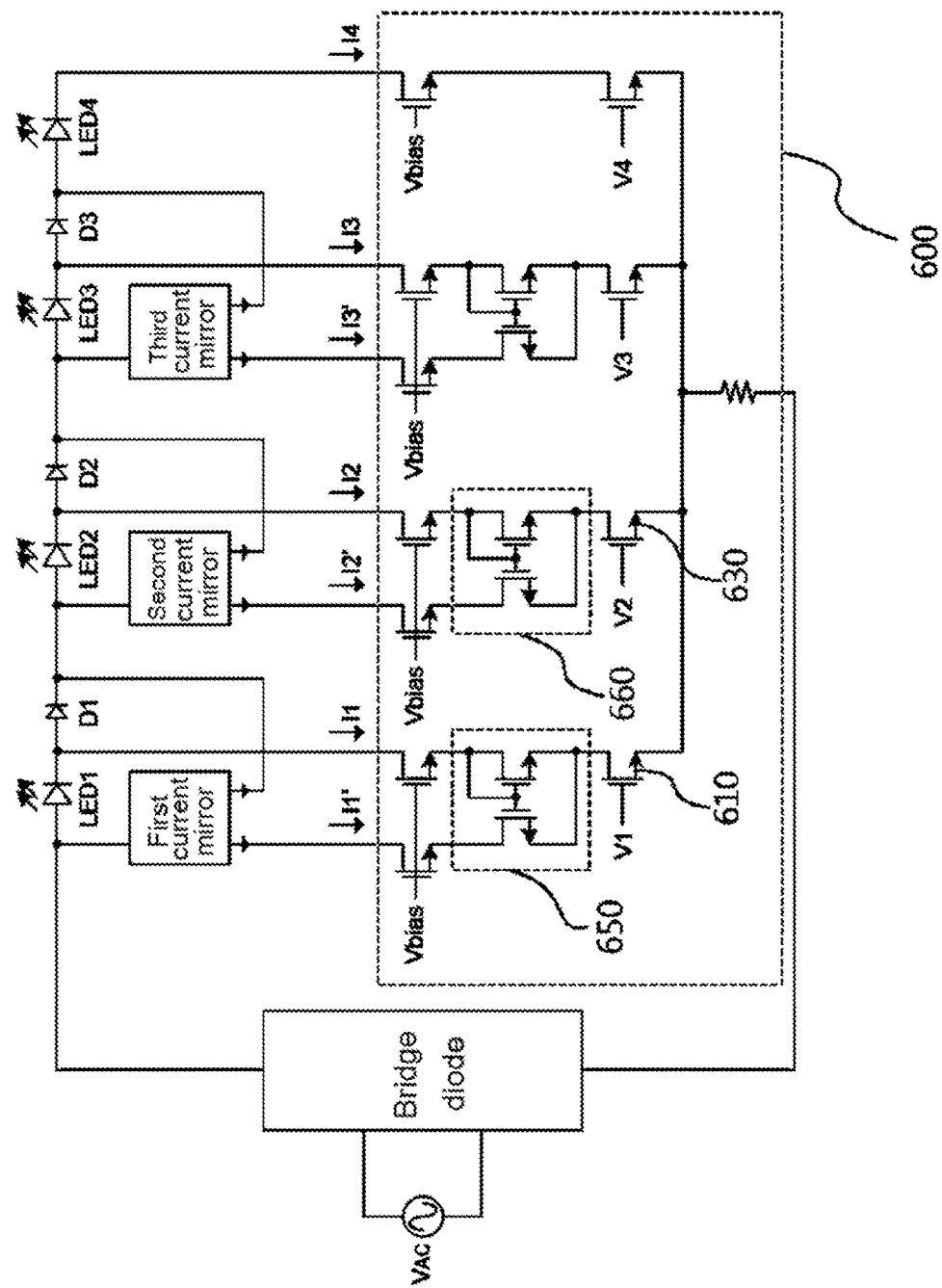
FIG. 17 is a view showing a third example of the current sensing and sequential current driving unit of the apparatus for synchronous driving of the multi-channel light emitting diodes according to another embodiment of the present invention.

FIG. 17 is a view showing a third example of the current sensing and sequential current driving unit 600 of the apparatus for synchronous driving of the multi-channel light emitting diodes according to another embodiment of the present invention. There is disclosed a circuit that implement a current sensing function by connecting a current mirror circuit to the current driving MOSFET and improving a current sensing characteristic by connecting a cascode element to the implemented current sensing function.

In other words, the current sensing and sequential current driving unit 600 may additionally include a first current sensing mirror 650 connected to the current mirror unit 400 through a first terminal thereof, connected to the cathode of the first light emitting diode 210 through a second terminal thereof and connected to the drain terminal of the first current driving MOSFET 610, and a second current sensing mirror 660 connected to the current mirror unit 400 through a first terminal thereof, connected to the cathode of the second light emitting diode 220 through a second terminal thereof and connected to the drain terminal of the second current driving MOSFET 630 through a third terminal thereof.

In addition, in the current sensing and sequential current driving unit 600, a cascode circuit may be formed by serially and respectively arranging bias MOSFETs to the drain terminals of the first current driving MOSFET 610 and the second current driving MOSFET 620, and to the first terminals of the first current sensing mirror 650 and the second current sensing mirror 660, and bias voltages Vbias may be respectively applied to gates of the bias MOSFETs.

Figure 18:
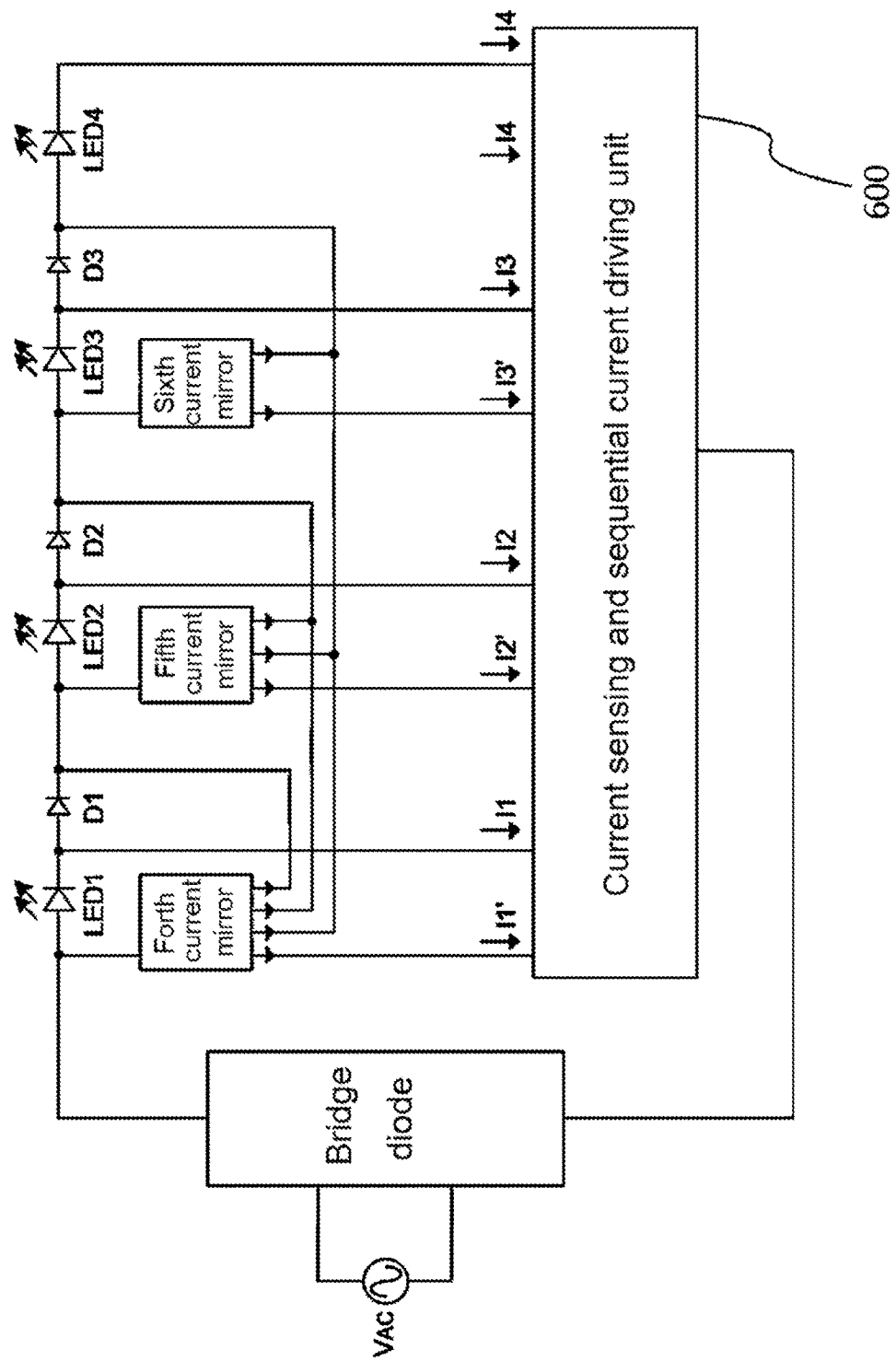
FIG. 18 is a view showing in detail a parallel current mirror unit of the apparatus for synchronous driving of the multi-channel light emitting diodes of FIG. 14 according to the embodiment of the present invention.

FIG. 18 is a view showing in detail the parallel current mirror unit of the apparatus for synchronous driving of the multi-channel light emitting diodes of FIG. 14 according to the embodiment of the present invention. In the apparatus for synchronous driving of the multi-channel light emitting diodes according to another embodiment of the present invention shown in FIG. 18, a combined structure of the current sensing and sequential current driving units 600 shown in FIGS. 15 to 17 may be applied to the embodiment. Herein, the remaining configuration except for the current sensor unit 300 and the sequential current driving unit 500 are similar to the configuration shown in FIG. 6, the reference numerals and detailed description thereof will be omitted for the sake of convenience.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for synchronous driving of multi-channel light emitting diodes, the apparatus comprising:
    a rectification unit receiving and rectifying an AC voltage;
    a multi-channel light emitting diode unit in which a plurality of light emitting diodes are serially connected with each other, the plurality of light emitting diodes including at least a first light emitting diode and a second light emitting diode, and being driven to emit light by receiving the rectified current from the rectification unit;
    a current sensor unit sensing a current flowing in the first light emitting diode;
    a current mirror unit mirroring the current sensed by the current sensor unit, and supplying the mirrored current to the second light emitting diode; and
    a sequential current driving unit connected to both the first light emitting diode and the second light emitting diode, providing a path to the current flowing in the first light emitting diode or in the second light emitting diode, and activating the current sensor unit according to an input voltage level.

2. The apparatus of claim 1, wherein the current mirror unit includes:
    a current mirror that is connected to an anode of the first light emitting diode through a first terminal thereof, connected to the current sensor unit through a second terminal thereof, and connected to an anode of the second light emitting diode through a third terminal thereof to generate the mirrored current from the sensed current; and
    a diode that is connected to a cathode of the first light emitting diode through an anode thereof, connected to the anode of the second light emitting diode through a cathode thereof to transmit the mirrored current to the second light emitting diode by receiving the mirrored current so that the mirrored current is prevented from being reversed to the first light emitting diode.

3. The apparatus of claim 2, wherein the current sensor unit includes a current sensor that is connected to the cathode of the first light emitting diode through a first terminal thereof, connected to the current mirror through a second terminal thereof, and connected to the sequential current driving unit through a third terminal thereof to transmit the sensed current to the sequential current driving unit.

4. The apparatus of claim 3, wherein the sequential current driving unit includes:
    a first MOSFET receiving a voltage that determines a current amount flowing in the first light emitting diode through a gate thereof, connected to the second terminal of the current sensor through a drain terminal thereof and connected to the rectification unit through a source terminal thereof, and turned on when the input voltage level is equal to or greater than a driving voltage of the first light emitting diode and is equal to or less than a sum of the driving voltage of the first light emitting diode and a driving voltage of the second light emitting diode; and
    a second MOSFET receiving a voltage that determines a current amount flowing in the second light emitting diode through a gate thereof, connected to the cathode of the second light emitting diode through a drain terminal thereof and connected to the rectification unit through a source terminal thereof, and turned on when the first MOSFET is turned on or when the input voltage level exceeds the sum of the driving voltage of the first light emitting diode and the driving voltage of the second light emitting diode.

5. The apparatus of claim 4, wherein the current sensor includes:
    a first sensing resistor connected to the cathode of the first light emitting diode through a first terminal thereof and connected to the sequential current driving unit through a second terminal thereof; and
    a first transistor connected to the first terminal of the first sensing resistor through a gate thereof, connected to the second terminal of the first sensing resistor through a source terminal thereof, and connected to the current mirror through a drain terminal thereof.

6. The apparatus of claim 5, wherein the current mirror includes:
    a second sensing resistor connected to the anode of the first light emitting diode through a first terminal thereof and connected to the drain terminal of the first transistor through a second terminal thereof; and
    a second transistor connected to the second terminal of the second sensing resistor through a gate thereof, connected to the first terminal of the second sensing resistor through a source terminal thereof, and connected to the anode of the second light emitting diode through a drain terminal thereof.

7. The apparatus of claim 6, wherein the first transistor is an N-type MOSFET and the second transistor is a P-type MOSFET.

8. The apparatus of claim 4, wherein the current mirror is an amplification circuit for generating an amplified current that is proportional to the sensed current as the mirrored current.

9. The apparatus of claim 4, wherein the current sensor is a first cascode current mirror circuit, and the current mirror is a second cascode current mirror circuit that is complementary to the first cascode current mirror circuit.

10. The apparatus of claim 4, wherein the current sensor is a first Widlar current mirror circuit, and the current mirror is a second Widlar current mirror circuit that is complementary to the first Widlar current mirror circuit.

11. The apparatus of claim 4, wherein the current sensor includes an amplification circuit that senses a current proportional to the sensed current and transmits the sensed proportional current to the current mirroring unit.

12. The apparatus of claim 4, wherein the current sensor includes:
    a third sensing resistor connected to the cathode of the first light emitting diode through a first terminal thereof and connected to the sequential current driving unit through a second terminal thereof; and
    a first voltage-current conversion circuit connected to the first terminal of the third sensing resistor through a first terminal thereof, connected to the second terminal of the third sensing resistor through a second terminal thereof, and connected to the current mirror through a third terminal thereof so as to convert a voltage applied to the third sensing resistor to a current and to transmit the converted current to the current mirror.

13. The apparatus of claim 12, wherein the current mirror includes:
a fourth sensing resistor connected to the anode of the first light emitting diode through a first terminal thereof and connected to the third terminal of the first voltage-current conversion circuit through a second terminal thereof; and
a second voltage-current conversion circuit connected to the first terminal of the fourth sensing resistor through a first terminal thereof, connected to the second terminal of the fourth sensing resistor through a second terminal thereof, and connected to the anode of the second light emitting diode through a third terminal thereof so as to convert a voltage applied to the fourth sensing resistor to a current and to transmit the converted current to the second light emitting diode.

14. The apparatus of claim 4, wherein the multi-channel light emitting diode unit further includes: a third light emitting diode, and
wherein the current mirror unit further includes: a parallel current mirror connected to the anode of the second light emitting diode through a first terminal thereof, connected to the current sensor unit through a second terminal thereof, and connected to an anode of the third light emitting diode through a third terminal thereof so as to generate the mirrored current from the sensed current; and
wherein the parallel current mirror further includes a fourth terminal connected to the anode of the third light emitting diode.

15. An apparatus for synchronous driving of multi-channel light emitting diodes, the apparatus comprising:
a rectification unit receiving and rectifying an AC voltage;
a multi-channel light emitting diode unit in which a plurality of light emitting diodes are serially connected with each other, the plurality of light emitting diodes including at least a first light emitting diode and a second light emitting diode, and being driven to emit light by receiving a rectified current from the rectification unit;
a current mirror unit mirroring a current flowing in the first light emitting diode, and supplying the mirrored current to the second light emitting diode; and
a current sensing and sequential current driving unit connected to both the first light emitting diode and the second light emitting diode, providing a path to a current flowing in the first light emitting diode or in the second light emitting diode, and activating the current mirror unit according to a plurality of input voltage levels.

16. The apparatus of claim 15, wherein the current sensing and sequential current driving unit includes:
a first current driving MOSFET receiving a first input voltage having the first input voltage level of a plurality input voltage levels through a gate thereof, connected to a cathode of the first light emitting diode through a drain terminal thereof and connected to the rectification unit through a source terminal thereof, and turned on according to the first input voltage level;
a second current driving MOSFET receiving a second input voltage having a second input voltage level of the plurality input voltage levels through a gate thereof, connected to a cathode of the second light emitting diode through a drain terminal thereof and connected to the rectification unit through a source terminal thereof, and turned on according to the second input voltage level;
a first current sensing MOSFET connected to the gate of the first current driving MOSFET through a gate thereof and connected to the source terminal of the first current driving MOSFET through a source terminal thereof, and turned on according to the first input voltage level; and
a second current sensing MOSFET connected to the gate of the second current driving MOSFET through a gate thereof and connected to the source terminal of the second current driving MOSFET through a source terminal thereof, and turned on according to the second input voltage level.

17. The apparatus of claim 16, wherein the current sensing and sequential current driving unit forms a cascade circuit by serially and respectively arranging bias MOSFETs to the drain terminals of the first current driving MOSFET, the second current driving MOSFET, the first current sensing MOSFET, and the second current sensing MOSFET, with bias voltages being respectively applied to gates of the bias MOSFETs.

18. The apparatus of claim 15, wherein the current sensing and sequential current driving unit includes:
a first current driving MOSFET receiving a first input voltage having a first input voltage level of the plurality input voltage levels through a gate thereof, connected to a cathode of the first light emitting diode through a drain terminal thereof and connected to the rectification unit through a source terminal thereof, and turned on according to the first input voltage level;
a second current driving MOSFET receiving a second input voltage having a second input voltage level of the plurality input voltage levels through a gate thereof, connected to a cathode of the second light emitting diode through a drain terminal thereof and connected to the rectification unit through a source terminal thereof, and turned on according to the second input voltage level;
a first current sensing mirror connected to the current mirror unit through a first terminal thereof, connected to the cathode of the first light emitting diode through a second terminal thereof and connected to the drain terminal of the first current driving MOSFET through a third terminal thereof; and
a second current sensing mirror connected to the current mirror unit through a first terminal thereof, connected to the cathode of the second light emitting diode through a second terminal thereof and connected to the drain terminal of the second current driving MOSFET through a third terminal thereof; wherein
bias MOSFETs are serially and respectively arranged to the drain terminals of the first current driving MOSFET and the second current driving MOSFET, and to the first terminals of the first current sensing mirror and the second current sensing mirror to form a cascade circuit, with bias voltages being respectively applied to gates of the bias MOSFETs.

19. The apparatus of claim 15, wherein the multi-channel light emitting diode unit further includes: a third light emitting diode, and
wherein the current mirror unit further includes: a parallel current mirror connected to the anode of the second light emitting diode through a first terminal thereof, connected to the current sensor unit through a second terminal thereof, and connected to an anode of the third light emitting diode through a third terminal thereof so as to generate the mirrored current from the sensed current; and wherein the parallel current mirror further includes a fourth terminal connected to the anode of the third light emitting diode.

20. The apparatus of claim 4, wherein the current sensor is a first Wilson current mirror circuit, and the current mirror is a second Wilson current mirror circuit that is complementary to the frist Wilson current mirror circuit.

* * * * *